(12) United States Patent
White

(10) Patent No.: US 12,197,184 B2
(45) Date of Patent: Jan. 14, 2025

(54) POWER TOOL WITH CRIMP IMAGE

(71) Applicant: Hubbell Incorporated, Shelton, CT (US)

(72) Inventor: Brian McCulloh White, Londonderry, NH (US)

(73) Assignee: Hubbell Incorporated, Shelton, CT (US)

( * ) Notice: Subject to any disclaimer, the term of this patent is extended or adjusted under 35 U.S.C. 154(b) by 32 days.

(21) Appl. No.: 17/352,619

(22) Filed: Jun. 21, 2021

(65) Prior Publication Data

US 2021/0397155 A1 Dec. 23, 2021

Related U.S. Application Data

(60) Provisional application No. 63/041,939, filed on Jun. 21, 2020.

(51) Int. Cl.
*G05B 19/4065* (2006.01)

(52) U.S. Cl.
CPC ............. *G05B 19/4065* (2013.01); *G05B 2219/50206* (2013.01)

(58) Field of Classification Search
CPC ...... G05B 19/4065; G05B 2219/50206; B25F 5/00; B25F 27/10; B25B 27/10; H01R 43/0427
See application file for complete search history.

(56) References Cited

U.S. PATENT DOCUMENTS

| | | |
|---|---|---|
| 3,087,530 A | 4/1963 | Resicher |
| 4,274,746 A | 6/1981 | Cardell |
| 5,113,679 A | 5/1992 | Ferraro |
| 5,195,042 A | 3/1993 | Ferraro |
| 5,291,772 A | 3/1994 | Ferraro |
| 5,490,406 A | 2/1996 | College |

(Continued)

FOREIGN PATENT DOCUMENTS

| | | |
|---|---|---|
| CA | 2939110 | 8/2015 |
| CA | 2996306 | 3/2017 |

(Continued)

OTHER PUBLICATIONS

Greenlee Tools, Inc, Next Generation Tools, Brochure MA6568 rev 08/18, 2018, Rockford, IL.

(Continued)

*Primary Examiner* — Kenneth M Lo
*Assistant Examiner* — Mohammed Shafayet
(74) *Attorney, Agent, or Firm* — Wissing Miller LLP

(57) ABSTRACT

Portable, hand-held, battery operated, hydraulic tools are provided with a tool frame, a force sensor, and a location detector. A piston actuated by a hydraulic system within the tool frame applies force to the working head to perform a task, such as to apply a crimp to an electrical connector. The tool determines the maximum force applied to the crimp and records that maximum force along with the geographic location of the tool when the crimp was formed. The maximum force provides an indication of the quality of the crimp and the recorded location allows a potentially defective crimp to be located. Images of crimps can be uploaded to a web service and linked to cycle information for retrieval and review at a later date.

43 Claims, 29 Drawing Sheets

(56) References Cited

U.S. PATENT DOCUMENTS

| | | | |
|---|---|---|---|
| 5,553,478 | A | 9/1996 | Di Troia |
| 5,657,417 | A | 8/1997 | Di Troia |
| 5,678,982 | A | 10/1997 | Schwaiger |
| 5,829,289 | A | 11/1998 | Fisher |
| 5,901,440 | A | 5/1999 | Maida |
| 5,961,561 | A | 10/1999 | Wakefield |
| 5,966,806 | A | 10/1999 | Maeda |
| 6,315,062 | B1 | 11/2001 | Alft |
| 6,369,560 | B1 | 4/2002 | Nghiem |
| 6,418,769 | B1 | 7/2002 | Schreinder |
| 6,419,426 | B1 | 7/2002 | Chalupa |
| 6,431,289 | B1 | 8/2002 | Potter |
| 6,446,482 | B1 | 9/2002 | Heskey |
| 6,474,378 | B1 | 11/2002 | Ryan |
| 6,526,853 | B2 | 3/2003 | Jenkins |
| 6,607,041 | B2 | 8/2003 | Suzuki |
| 6,745,611 | B2 | 6/2004 | Lefavour |
| 6,788,199 | B2 | 9/2004 | Crabtree |
| 6,792,789 | B1 | 9/2004 | Faucher |
| 6,957,560 | B2 | 10/2005 | Lefavour |
| 7,034,684 | B2 | 4/2006 | Boman |
| 7,165,439 | B2 | 1/2007 | Lefavour |
| 7,181,942 | B2 | 2/2007 | Yost |
| 7,346,422 | B2 | 3/2008 | Tsuchiya |
| 7,464,578 | B2 | 12/2008 | Ayer |
| 7,471,892 | B2 | 12/2008 | Spaulding |
| 7,487,654 | B2 | 2/2009 | Lefavour |
| 7,493,791 | B2 | 2/2009 | Chadoume |
| 7,608,790 | B2 | 10/2009 | Patton |
| 7,613,590 | B2 | 11/2009 | Brown |
| RE41,160 | E | 3/2010 | Gilmore |
| 7,719,418 | B2 | 5/2010 | Grossman |
| 7,750,811 | B2 | 7/2010 | Puzio |
| 7,823,433 | B2 | 11/2010 | Zhang |
| 7,832,638 | B2 | 11/2010 | Wetzel |
| 7,942,211 | B2 | 5/2011 | Scrimshaw |
| 7,954,232 | B2 | 6/2011 | Huang |
| 8,077,026 | B2 | 12/2011 | Jobe |
| 8,079,242 | B2 | 12/2011 | Pacaud |
| 8,084,981 | B2 | 12/2011 | Miwa |
| 8,089,247 | B2 | 1/2012 | Pellenc |
| 8,095,340 | B2 | 1/2012 | Brown |
| 8,113,099 | B2 | 2/2012 | Lihl |
| 8,138,988 | B2 | 3/2012 | Furnanz |
| 8,210,273 | B2 | 7/2012 | Suzuki |
| 8,224,256 | B2 | 7/2012 | Citrano |
| 8,232,897 | B2 | 7/2012 | Tieman |
| 8,255,070 | B2 | 8/2012 | Gamboa |
| 8,260,452 | B2 | 9/2012 | Austin |
| 8,310,544 | B2 | 11/2012 | Kim |
| 8,373,749 | B2 | 2/2013 | Burton |
| 8,406,697 | B2 | 3/2013 | Arimura |
| 8,412,179 | B2 | 4/2013 | Gerold |
| 8,517,558 | B2 | 8/2013 | Oomori |
| 8,570,536 | B2 | 10/2013 | Kelly |
| 8,579,043 | B2 | 11/2013 | Hirayama |
| 8,600,304 | B2 | 12/2013 | Frost |
| 8,903,643 | B2 | 2/2014 | Nielsen |
| 8,692,649 | B2 | 4/2014 | Clevenger |
| 8,766,794 | B2 | 7/2014 | Ferguson |
| 8,839,653 | B2 | 9/2014 | Roman |
| 8,919,456 | B2 | 12/2014 | Ng |
| 8,978,263 | B2 | 3/2015 | Nahum |
| 9,073,394 | B1 | 7/2015 | Clasquin |
| 9,138,207 | B2 | 9/2015 | Igov |
| 9,156,148 | B2 | 10/2015 | King |
| 9,174,752 | B2 | 11/2015 | Neeser |
| 9,210,581 | B2 | 12/2015 | Toepke |
| 9,233,457 | B2 | 1/2016 | Wanek |
| 9,233,458 | B2 | 1/2016 | Schmidt |
| 9,256,988 | B2 | 2/2016 | Wenger |
| 9,367,062 | B2 | 6/2016 | Volpert |
| 9,373,015 | B2 | 6/2016 | Swenson |
| 9,430,928 | B2 | 8/2016 | Ikeda |
| 9,466,198 | B2 | 10/2016 | Burch |
| 9,467,862 | B2 | 10/2016 | Zeiller |
| 9,555,537 | B2 | 1/2017 | Iwata |
| 9,559,755 | B2 | 1/2017 | Breitenbach |
| 9,575,091 | B2 | 2/2017 | Reeder |
| 9,595,839 | B2 | 3/2017 | Furui |
| 9,591,228 | B2 | 4/2017 | Cisi |
| 9,652,217 | B2 | 5/2017 | Winkler |
| 9,700,997 | B2 | 7/2017 | Schlegel |
| 9,756,402 | B2 | 9/2017 | Stampfl |
| 9,766,608 | B2 | 9/2017 | Wuertele |
| 9,776,309 | B2 | 10/2017 | Fluhrer |
| 9,783,936 | B2 | 10/2017 | Gareis |
| 9,799,929 | B2 | 10/2017 | Kawase |
| 9,808,918 | B2 | 11/2017 | Lawton |
| 9,813,110 | B2 | 11/2017 | Glauning |
| 9,817,839 | B2 | 11/2017 | Kahle |
| 9,819,132 | B2 | 11/2017 | Peloquin |
| 9,842,408 | B2 | 12/2017 | Milne |
| 9,868,184 | B2 | 1/2018 | Moss |
| 9,878,432 | B2 | 1/2018 | Linehan |
| 9,888,300 | B2 | 2/2018 | Stampfl |
| 9,900,967 | B2 | 2/2018 | Isaacs |
| 9,940,813 | B2 | 4/2018 | Nishikawa |
| 10,131,061 | B2 | 11/2018 | Krans |
| 10,427,201 | B2 | 10/2019 | Bungter |
| 10,431,950 | B2 | 10/2019 | Rzasa |
| 10,630,036 | B2 | 4/2020 | Rzasa |
| 10,710,223 | B2 | 7/2020 | Rosani |
| 10,784,641 | B2 | 9/2020 | Couch et al. |
| 2003/0154761 | A1 | 8/2003 | Lefavour |
| 2007/0019400 | A1 | 1/2007 | Clausen |
| 2008/0282762 | A1 | 11/2008 | Rzasa |
| 2008/0282763 | A1 | 11/2008 | Chiasson |
| 2008/0300580 | A1 | 12/2008 | Shelton, IV |
| 2009/0040053 | A1 | 2/2009 | White |
| 2009/0251330 | A1 | 10/2009 | Gerold |
| 2010/0023156 | A1* | 1/2010 | Trepina ............... G05B 19/406 700/177 |
| 2010/0186234 | A1 | 7/2010 | Binder |
| 2011/0016664 | A1 | 1/2011 | Kerr |
| 2011/0022052 | A1 | 1/2011 | Jorgensen |
| 2011/0190936 | A1 | 8/2011 | Koeder |
| 2011/0235312 | A1 | 9/2011 | Houser |
| 2011/0289998 | A1 | 12/2011 | Zhang |
| 2012/0169485 | A1 | 7/2012 | Eckert |
| 2012/0314226 | A1 | 12/2012 | Kelly |
| 2013/0112673 | A1 | 5/2013 | Petrilla |
| 2013/0138465 | A1 | 5/2013 | Kahle |
| 2013/0153250 | A1 | 6/2013 | Eckert |
| 2013/0233043 | A1 | 9/2013 | Kelly |
| 2013/0240228 | A1 | 9/2013 | Lefavour |
| 2013/0277078 | A1 | 10/2013 | Wallgren |
| 2014/0001224 | A1 | 1/2014 | McNeill |
| 2014/0005820 | A1 | 1/2014 | Roehm |
| 2014/0008088 | A1 | 1/2014 | Chellew |
| 2014/0102739 | A1 | 4/2014 | Tamm |
| 2014/0107853 | A1 | 4/2014 | Ashinghurst |
| 2014/0157522 | A1 | 6/2014 | Lorini |
| 2014/0180464 | A1 | 6/2014 | Koerber |
| 2014/0184397 | A1 | 7/2014 | Volpert |
| 2014/0229409 | A1 | 8/2014 | Kaushal et al. |
| 2014/0259599 | A1 | 9/2014 | Glaspell |
| 2015/0020372 | A1 | 1/2015 | Linder |
| 2015/0101186 | A1 | 4/2015 | Kelly |
| 2015/0136829 | A1 | 5/2015 | Howes |
| 2015/0253766 | A1 | 9/2015 | Pettersson |
| 2015/0257636 | A1 | 9/2015 | Kohler |
| 2015/0263472 | A1 | 9/2015 | Sneath |
| 2015/0286209 | A1 | 10/2015 | Kreuzer |
| 2015/0314434 | A1 | 11/2015 | Bevins, Jr. |
| 2015/0316913 | A1 | 11/2015 | Rickey |
| 2015/0367497 | A1 | 12/2015 | Ito |
| 2015/0375388 | A1 | 12/2015 | Ullrich |
| 2016/0016222 | A1 | 1/2016 | Bungter |
| 2016/0046010 | A1 | 2/2016 | Busscharet |
| 2016/0048122 | A1 | 2/2016 | Lukosz |
| 2016/0104994 | A1 | 4/2016 | Cramer |
| 2016/0166138 | A1 | 6/2016 | Yamanaka |

(56) References Cited

U.S. PATENT DOCUMENTS

| | | |
|---|---|---|
| 2016/0167186 A1* | 6/2016 | Chan .................. G05B 19/4185 173/2 |
| 2016/0178398 A1 | 6/2016 | Krapf |
| 2016/0183776 A1 | 6/2016 | Yamanaka |
| 2016/0311094 A1 | 10/2016 | Mergener |
| 2016/0342142 A1 | 11/2016 | Boeck |
| 2016/0342151 A1 | 11/2016 | Dey, IV |
| 2016/0351039 A1 | 12/2016 | Nishikawa |
| 2016/0354889 A1 | 12/2016 | Ely |
| 2016/0354905 A1 | 12/2016 | Ely |
| 2016/0363510 A1* | 12/2016 | Kanack .................. B25B 27/10 |
| 2016/0364687 A1* | 12/2016 | Matson .................. G06F 3/0482 |
| 2016/0373457 A1 | 12/2016 | Matson |
| 2016/0375570 A1 | 12/2016 | Boeck |
| 2017/0008159 A1 | 1/2017 | Boeck |
| 2017/0028536 A1 | 2/2017 | Lefavour |
| 2017/0057040 A1 | 3/2017 | Rzasa |
| 2017/0063014 A1 | 3/2017 | Rzasa |
| 2017/0110006 A1 | 4/2017 | Yamamoto |
| 2017/0153631 A1 | 6/2017 | Jonsson |
| 2017/0162035 A1 | 6/2017 | Kusakawa |
| 2017/0173751 A1 | 6/2017 | Stock |
| 2017/0173768 A1 | 6/2017 | Dey |
| 2017/0174374 A1 | 6/2017 | Figiel |
| 2017/0180536 A1 | 6/2017 | Stock |
| 2017/0190041 A1 | 7/2017 | Dey |
| 2017/0199509 A1 | 7/2017 | Khalaf |
| 2017/0201853 A1 | 7/2017 | Chen |
| 2017/0216986 A1 | 8/2017 | Dey |
| 2017/0269167 A1 | 9/2017 | Willey |
| 2017/0302044 A1 | 10/2017 | Lefavour |
| 2017/0317460 A1 | 11/2017 | Broker |
| 2017/0353041 A1 | 12/2017 | Klee |
| 2017/0353847 A1 | 12/2017 | Coulis |
| 2018/0054033 A1 | 2/2018 | Skonieczny |
| 2018/0085909 A1 | 3/2018 | Koski |
| 2018/0099388 A1 | 4/2018 | Koski |
| 2018/0161969 A1 | 6/2018 | Rosani |
| 2018/0367874 A1 | 12/2018 | Stampfl |
| 2019/0156278 A1 | 5/2019 | Matson et al. |
| 2019/0160643 A1* | 5/2019 | Lefavour .................. B25F 3/00 |
| 2019/0222957 A1* | 7/2019 | Burch .................. B25H 3/02 |
| 2019/0384256 A1 | 12/2019 | Kreuser et al. |
| 2020/0106230 A1 | 4/2020 | White et al. |
| 2020/0161822 A1 | 5/2020 | Glockseisen |
| 2020/0235541 A1 | 7/2020 | Rzasa |

FOREIGN PATENT DOCUMENTS

| | | |
|---|---|---|
| WO | 2009047629 | 4/2009 |
| WO | 2014131627 | 9/2014 |
| WO | 2015016340 | 2/2015 |
| WO | 2016165869 | 10/2016 |
| WO | 2016203315 | 12/2016 |
| WO | 2016206860 | 12/2016 |
| WO | 2017027446 | 2/2017 |
| WO | 2017035469 | 3/2017 |
| WO | 2017035518 | 3/2017 |
| WO | 2017045980 | 3/2017 |
| WO | 2017089100 | 6/2017 |
| WO | 2017102514 | 6/2017 |
| WO | 2017167783 | 10/2017 |
| WO | 2017190975 | 11/2017 |
| WO | 2017215996 | 12/2017 |
| WO | 2018050415 | 3/2018 |

OTHER PUBLICATIONS

ISR & WO mailed in PCT/US2021/038182 on Sep. 27, 2021 (11 pages).
International Preliminary Report on Patentability mailed in corresponding PCT/US21/38182 dated Jan. 5, 2023 (10 pages).
ABB Smart Tool + Quick Start Guide, 2018. (12 pages).
Extended European Search Report in corresponding European Application No. 21828537.7 mailed Jun. 18, 2024. (10 pages).

* cited by examiner

| Index # | Pressure (K PSI) | Latitude | Longitude | Altitude | Date | Time | Flag | Comment |
|---|---|---|---|---|---|---|---|---|
| 1 | 10.750 | 41.0165248 | -74.1137584 | 100.6 | 01/15/18 | 12:32 pm | ⚑ | crimp failed - user error |
| 2 | 10.980 | 41.06 | | 101.5 | 01/15/18 | 12:40 pm | | |
| | | | | | | | | |

| | Crimp History | |
|---|---|---|
| Crimp No. ↑ | Date & Time | Output Force ▽ |
| 26 ⊕ 🗨 | 08/15/2019 - 02:30 PM | Pass |
| 25 ⊕ 🗨 | 08/15/2019 - 11:52 PM | Fail |
| 24 ⊕ | 08/15/2019 - 01:47 PM | Pass |
| 23 ⊕ 🗨 | 08/15/2019 - 01:47 PM | Pass |

*FIG. 16*

| Service History | | 🗓 Calendar |
|---|---|---|
| Serial No. ↓ | | Date & Time |
| 1 | | 08/27/2019 - 02:30 PM |
| Tool Event: 1394851 | | |
| Total Crimps at service: 1 | | |
| 2 | | 08/28/2019 - 09:39 AM |
| Tool Event: 1234567 | | |
| Total Crimps at service: 4 | | |
| 3 | | 09/28/2019 - 09:40 AM |
| Tool Event: 7654321 | | |
| Total Crimps at service: 70 | | |

*FIG. 17*

App Screen: Crimp History Before Adding Crimp Image

| Crimp No. ⇩ | Date & Time | Output Force ▽ |
|---|---|---|
| 10 | 11/20/2019-5:44 PM | Fail |
| 9 | 11/20/2019-5:44 PM | Fail |
| 8 | 11/20/2019-5:38 PM | Fail |
| 7 | 11/20/2019-5:26 PM | Fail |
| 6 | 11/20/2019-4:33 PM | Fail |
| 5 | 11/20/2019-4:31 PM | Fail |
| 4 | 11/20/2019-4:18 PM | Fail |
| 3 ▢▷ | 11/20/2019-3:55 PM | Fail |
| 2 | 11/20/2019-3:55 PM | Fail |
| 1 | 11/19/2019-7:38 PM | Fail |

*FIG. 19*

App Screen: Adding Crimp Image

App Screen: Built-In Camera & Gallery

App Screen: Selected Crimp Image Preview

Web Service Screen: Crimp Record without Crimp Image

Comments

Crimp No: 3

View on Map

Comments:

Flagged: 0

Add Image

Edit

Close

FIG. 23

App Screen: Crimp History After Adding Crimp Images

| Crimp No. ⬇ | | Date & Time | Output Force ⬇ | |
|---|---|---|---|---|
| 10 | 🖻 | 11/20/2019-5:44 PM | Fail | ⎫ 222 |
| 9 | 🖻 | 11/20/2019-5:43 PM | Fail | |
| 8 | 🖻 | 11/20/2019-5:38 PM | Fail | ⎫ 222 |
| 7 | 🖻 | 11/20/2019-5:26 PM | Fail | |
| 6 | 🖻 | 11/20/2019-4:33 PM | Fail | |
| 5 | 🖻 | 11/20/2019-4:31 PM | Fail | |
| 4 | 🖻 | 11/20/2019-4:18 PM | Fail | |
| 3 | 🗐▷🖻 | 11/20/2019-3:55 PM | Fail | ⎫ 222 |
| 2 | 🖻 | 11/20/2019-3:55 PM | Fail | |
| 1 | 🖻 | 11/19/2019-7:38 PM | Fail | |

*FIG. 25*

App Screen: View Crimp Image

App Screen: View Crimp Image

Web Service Screen: Crimp Record with Uploaded Image

Comments

Crimp No: 3

View on Map

Comments:

Flagged: 0

View Image

Edit

Close

| Crimp No. | Date & Time | Output Force | Crimp Location | Crimp Image |
|---|---|---|---|---|
| 31 | 11/04/2019 08:49:06 AM | Pass | Poor Signal | |
| 32 | 11/04/2019 08:49:15 AM | Pass | Poor Signal | |
| 33 | 11/04/2019 08:50:01 AM | Pass | Poor Signal | |
| 34 | 11/08/2019 09:10:21 AM | Pass | 33.4448394,-111.96141 | |
| 35 | 11/08/2019 09:25:06 AM | Pass | 33.4448699,-111.96135 | |
| | Crimp comment | | | |

FIG. 31

| Crimp No. | Date & Time | Output Force | Crimp Location |
|---|---|---|---|
| 31 | 11/04/2019 08:49:06 AM | Pass | Poor Signal |
| 32 | 11/04/2019 08:49:15 AM | Pass | Poor Signal |
| 32 | 11/04/2019 08:50:01 AM | Pass | Poor Signal |
| 34 | 11/08/2019 09:10:21 AM | Pass | 33.4448394,-111.96141 |
| 35 | 11/08/2019 09:25:06 AM | Pass | 33.4448699,-111.96135 |
| | Crimp comment | | |
| |  | | |

POWER TOOL WITH CRIMP IMAGE

CROSS REFERENCE TO RELATED APPLICATIONS

The present disclosure is based on and claims benefit from co-pending U.S. Provisional Patent Application Ser. No. 63/041,939 filed on Jun. 21, 2020, entitled "Power Tool with Crimp Image" the contents of which are incorporated herein in their entirety by reference.

BACKGROUND

Field

The present disclosure relates to power tools that can monitor the tool's operating cycle on a workpiece, record tool cycle information associate with the tool's operating cycle on the workpiece and upload one or more images associated with the tool's operating cycle and/or the workpiece.

Description of the Related Art

Portable, handheld power tools are used to perform a variety of tasks. Such tools include a power source such as a battery, an electric motor, and a working component, such as a saw, cutting blade, grinding wheel, or crimper. Some portable tools incorporate a hydraulic pump to drive an actuator, e.g., a piston, to apply a relatively large amount of force or pressure for a particular task. Some of these hydraulic tools include a working head with working surfaces shaped to perform a particular action on a workpiece, for example, to deform a crimp connector onto the surface of a conductor to form a crimped connection. To make such connection a connector is fitted over the conductor. The connector is placed between the working surfaces of the tool. Force from the actuator, e.g., a piston, actuated by the hydraulic system closes the working surfaces onto the connector, pressing it against the conductor and plastically deforming both the connector and the conductor to create a stable mechanical and electrical connection. Sufficient force needs to be applied to deform the connector around the strands of the conductor. Otherwise, the connection may not be mechanically stable or may introduce excessive electrical resistance when current flows through the conductor. Known hydraulic crimping tools include systems for measuring the maximum force applied to the workpiece.

When constructing many commercial facilities, it is often important that all electrical connections are proper so that there are no electrical connection failures. This is especially true for data centers, where it is important to maintain the operation of the data center. To ensure contractors are following all required regulations and requirements for making electrical connections, many quality assurance inspectors are requiring contractors to complete quality control sheets that prove that tools used to make electrical connections have been calibrated and provide a listing of all electrical connections made with the tool. Additionally, if a contractor makes an electrical connection that they are unsure of for any reason, the contractor may take a picture of the connector after the electrical connection is made and send it to an inspector to verify that the electrical connection is satisfactory. If the inspector verifies the electrical connection is satisfactory, this inspector verification may not be memorialized such that there may be no traceability that the inspector verified the electrical connection. Further, in the event the inspector reviews the image of the electrical connection sent by the contractor for review and determines the electrical connection needs to be redone, it may be challenging to locate that same electrical connection in order to make a new electrical connection, e.g., make a new crimp.

SUMMARY

The present disclosure provides exemplary embodiments of systems that may include portable power tools with a tool frame and working head, a mobile platform that can take pictures and optionally a centralized web based computing system. The system may also include an application running on the mobile platform that allows a user to take or upload an image or picture of a workpiece after the tool completes an operating cycle on the workpiece and links the image or picture to a particular cycle data record of the tool's operating cycle associated with the operation on the workpiece. The images can then be shared amongst contractors or uploaded to the centralized web based computing system or other locations, or the images can be stored in the database of the centralized web based computing system, the mobile platform and/or the power tool. These stored images can then be viewed later on the App or via the website.

The power tools are capable of monitoring one or more characteristics of an operating cycle of the tool, determining a geographic location of the power tool when the particular operating cycle is activated, and recording the date, time, and location information in memory for later use. Comments may be added to each cycle image record stored on the tool and used to locate where the particular operating cycle was activated. The recorded characteristics of an operating cycle of a tool, and the location information, date and time allow tool managers, tool users or other parties to review, for example, the quality of the operations performed by the tool on workpieces. The mobile platform, e.g., a smartphone or camera, is capable of taking one or more images of one or more workpieces after the operating cycle of the tool is completed, and to link the images to cycle data record stored in the power tool and/or in a database of a centralized web based computing system. As a non-limiting example, for power crimping tools, the tools are capable of monitoring a force applied by the tool when an electrical connection is crimped, determining a geographic location of the power tool when the crimp connection is formed, and recording the date, time, and location information in the tool's memory. Comments may be added to each cycle image record that can be used to locate where crimps were formed. The recorded force, location information, time and date allow tool managers, tool users or other parties to review the quality of the crimp connections formed using the tool. The mobile platform, e.g., a smartphone or camera, is capable of taking an image of one or more crimped electrical connections and to link the image to a cycle data record stored in the power crimping tool, the mobile platform and/or in a database of a centralized web based computing system.

As noted, systems according to the present disclosure can link one or more images of a workpiece after a tool's operating cycle has completed to individual cycle data records stored in the power tool and/or in a centralized web based computing system. By centralizing the images of workpiece after a tool's operating cycle has completed in an easily organized and accessible location, e.g., a centralized web based computing system, contractors can generate detailed reports establishing that all workpiece operations on a particular job were done satisfactorily, and they can also demonstrate that all or a subset of all workpiece operations were imaged and visually inspected for compliance with job specifications. The advantage of linking the images to the individual cycle data records is that each individual cycle data record is capable of having latitude and longitude coordinates, as well as comments, which can be used to locate exactly where a particular workpiece operation was performed. For example, the power tool may be a power crimping tool, and the system according to the present disclosure links one or more images of a crimped electrical connection to individual cycle data records stored in a power tool and/or in a centralized web based computing system. By centralizing the images of crimped electrical connections in an easily organized and accessible location, e.g., a centralized web based computing system, contractors can generate detailed reports establishing that all crimp electrical connections on a particular job were done satisfactorily, e.g., the power tool achieved a required force or pressure during a crimp operation, and they can also demonstrate that all or a subset of all crimped electrical connections were imaged and visually inspected for compliance with job specifications. In this example, the advantage of linking the images to the individual cycle data records is that each individual cycle data record is capable of having latitude and longitude coordinates, as well as comments, which can be used to locate exactly where a particular crimped electrical connection was made.

When a crimp report is generated for a particular power tool, the user has the option to show any images associated with crimps in the report as thumbnails or full sized images. The report output can provide proof that every crimped electrical connection was made correctly, or if a questionable crimp was identified from the image, the location of the questionable crimped electrical connection can be easily found using the geo-location and comment data associated with the individual crimped record.

In an exemplary embodiment, a tool system according to the present disclosure includes a tool and a mobile platform. The tool includes a tool frame and a working head coupled to the tool frame. The working head is configured to perform an operation on a workpiece. The tool may be, for example, a crimping tool where the working head is configured to perform a crimping operation on the workpiece. The tool also includes an actuator, a drive system and a control system. The actuator is disposed at least partially in the tool frame and is operatively coupled to the working head to perform the operation on the workpiece. The drive system is positioned within the tool frame and is used to move the actuator between a home position and an operating position. When in the operating position, the working head performs the operation on the workpiece. The control system includes tool memory and a controller. The tool memory stores tool information and tool cycle information. The tool cycle information is associated with the operation performed on the workpiece by the working head. The controller is electrically connected with the tool memory and the actuator. In response to an activation signal, the controller causes the actuator to move from the home position to the operating position and stores the tool cycle information in the tool memory. The mobile platform has a camera and is wirelessly paired to the control system of the tool so that an image taken by the mobile platform can be linked to the cycle information stored in the tool memory. In an exemplary embodiment, the mobile platform is a smartphone. The tool system may also include a cloud computing service in wireless communication with the mobile platform. An example of a cloud computing service is a web service. In this exemplary embodiment, the mobile platform receives the stored tool cycle information from the control system and transmits the stored tool cycle information and the linked images to the cloud computing service. In addition, the mobile platform receives the stored tool information from the control system and transmits the stored tool information to the cloud computing service.

It is noted that the present disclosure is not limited to hydraulic power tools, but may also include mechanical tools used to perform a particular operation on a workpiece.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 8 is a table illustrating an exemplary embodiment of a data structure for storing force data, location data and time stamp data according to the present disclosure;

FIG. 11 is a graphic illustration of a computing device display according to an exemplary embodiment of the present disclosure;

FIG. 16 is another exemplary rendering of a crimp history page of an App running on a computing device forming part of a computing system used to manage the operation of one or more tools according to the present disclosure;

FIG. 17 is an exemplary rendering of a service history page of an App running on a computing device forming part of a computing system used to manage the operation of one or more tools according to the present disclosure;

FIG. 19, is another exemplary rendering of a crimp history page of an App running on a computing device forming part of a computing system used to manage the operation of one or more tools according to the present disclosure;

FIG. 23 is an exemplary rendering of a cycle data record without a linked image retrieved from a cloud computing service and rendered on a computing device forming part of a computing system used to manage the operation of one or more tools according to the present disclosure;

FIG. 25, is another exemplary rendering of a crimp history page while multiple crimps have images linked to them from an App running on a computing device forming part of a computing system used to manage the operation of one or more tools according to the present disclosure;

FIG. 28 is another exemplary rendering of a cycle data record with a linked image retrieved from a cloud computing service and rendered on a computing device forming part of a computing system used to manage the operation of one or more tools according to the present disclosure;

FIGS. 30-33 are embodiments of an exemplary crimp report that can be generated by the cloud computing services of the present disclosure.

DETAILED DESCRIPTION

Figure 1:
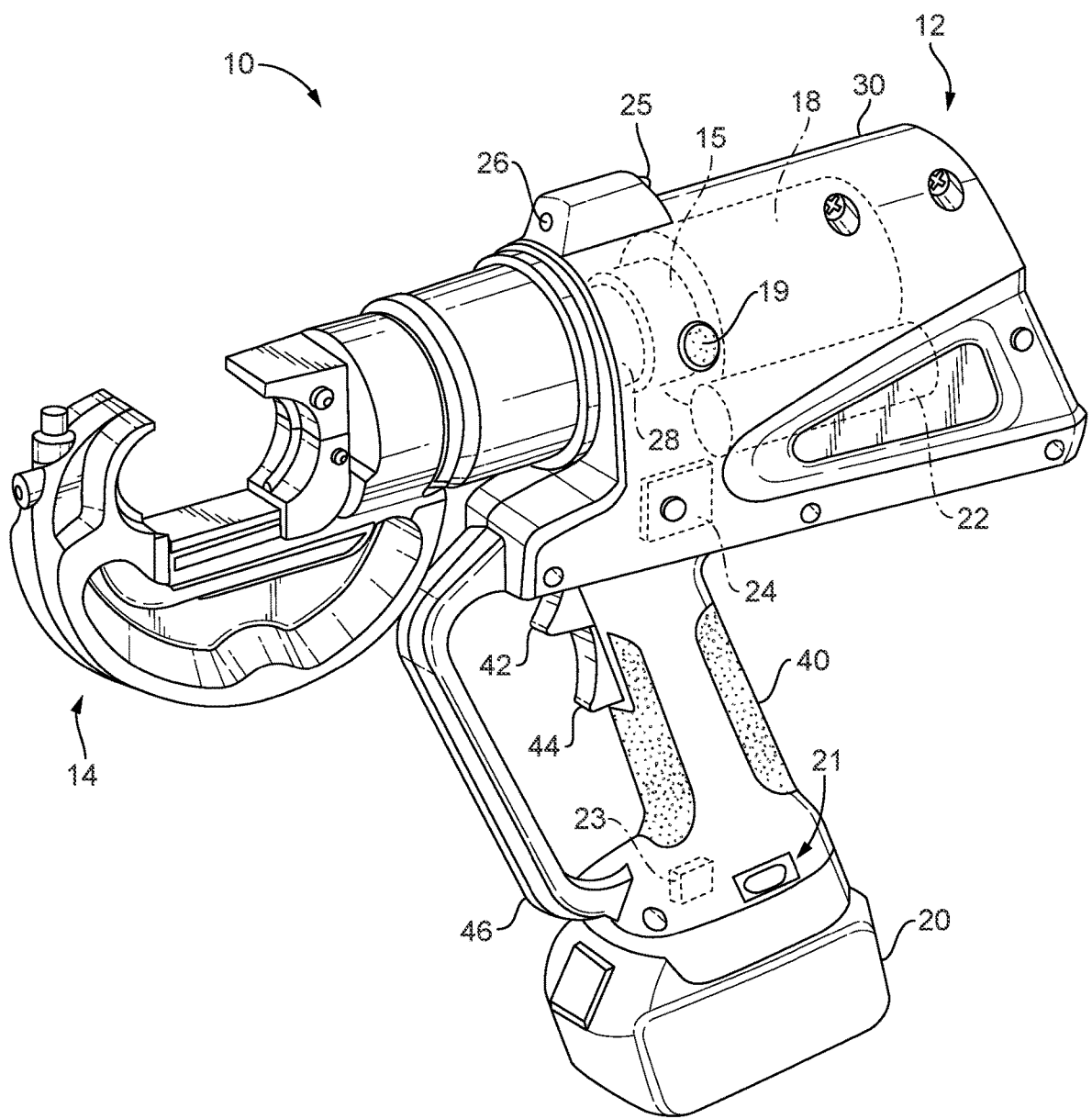
FIG. 1 is a front perspective view of an exemplary embodiment of a tool according to the present disclosure.

The present disclosure provides embodiments of portable, hand-held, battery operated, tools that have an operating cycle that perform a desired operation on a workpiece and that can communicate with external computing systems to for example upload images of operations performed on workpieces. Non-limiting examples of such desired operations include, crimping, sawing, cutting or grinding operations on a workpiece. The present disclosure provides embodiments of computing systems that communicate with such tools to receive tool operating cycle information and other tool information. The computing systems according to the present disclosure may include, for example, one or more computing devices and cloud computing services. The one or more computing devices may include, for example, desktop and laptop computers, smartphones and tablets. For ease of description, the tool operating cycle information may also be referred to herein as the "cycle information." The cycle information includes information associated the operating cycles of the tool, and the other tool information includes, tool diagnostic information, tool connectivity with a computing system, and the like. For ease of description, the cloud computing services may also be referred to herein as the "web services."

For ease of description, the tools described herein are portable, hand-held, battery operated, hydraulic crimping tools used for forming crimps and other electrical connections, and for monitoring and recording cycle information associated with crimp operating cycles of the crimping tools, and systems for verifying crimped electrical connections by, for example, uploading images of crimps on workpieces. For ease of description, the crimped electrical connections contemplated herein may also be referred to as the "crimp" in the singular and the "crimps" in the plural. The information associated with a crimp or crimps contemplated herein may also be referred to as the "cycle information." The cycle information contemplated by the present disclosure for a crimping tool includes, but is not limited to, the type and size of the workpiece to be crimped, a force applied by the tool to form the crimp, a time stamp when the crimp was formed, a location of the tool when the crimp was formed, status of the crimp, a data flag setting, alpha-numeric information associated with the flag, and other alpha-numeric information associated with the crimp. Cycle information for a particular crimp is stored in a cycle data record. Each cycle data record may also include other information, such as other crimp related information and/or tool related information and/or images associated with particular crimps. An example of other crimp related information included in each cycle data record includes a Crimp Image flag or key with an associated binary value, e.g., 1 or 0. The "Crimp Image" flag set to "1" may reflect that there is an image associated with the cycle data record and the "Crimp Image" flag set to "0" may reflect that there is no image associated with the cycle data record. The workpieces contemplated by the present disclosure for the crimping tool described herein include, but are not limited to, lug connectors, splice connectors and other wire terminations or endpoints. The time stamps contemplated by the present disclosure include, but are not limited to, the time of day a crimp was formed, the date a crimp was formed.

Turning to the figures, FIGS. 1-4 show an exemplary embodiment of a hydraulic power tool 10 according to the present disclosure. The tool 10 includes a tool frame 12 and a working head 14. The tool frame 12 includes a main body 30 and a handle 40 that form a pistol-like shape. However, the tool frame 12 could be in any suitable type of shape. Within the main body 30 of the tool frame 12 is a battery driven drive and control system 11 illustrated schematically in FIG. 2. The drive and control system 11 includes a drive system and a control system. In the exemplary embodiment shown, the drive system is a hydraulic drive system that includes a motor 18, a gear reduction box 48, a pump 15, a hydraulic fluid reservoir 22, a hydraulic drive 28 and a relief valve 29. However, the drive system may be an electromechanical system with the motor 18 and gear reduction box 48. In the exemplary embodiment shown, the control system includes a battery 20, a controller 24, memory 32, one or more operator controls 42 and 44, a communication port 21, a location system 23, a stroke sensor 16, a force sensor 27, a flag switch 19, a status indicator 25 and a work light 26.

The battery 20 provides power to the controller 24. The battery 20 also provides power to the motor 18 under the control of controller 24 and the operator controls 42 and 44. The motor 18 drives the pump 15 via gear reduction box 48. The pump 15 is in fluid communication with the hydraulic fluid reservoir 22. When driven by the motor 18, the pump 15 delivers fluid under pressure from reservoir 22 to the hydraulic drive 28. Force generated by hydraulic drive 28 is delivered via an actuator 60, such as a piston seen in FIG. 4, to the working head 14, as described below. The force sensor 27 is provided to measure the force applied to a workpiece as described below. Non-limiting examples of the force sensor 27 include pressure sensors or transducers, load cells, strain gauges and other force measuring devices. In the exemplary embodiment of the tool 10 described herein, the force sensor 27 is a pressure sensor. The pressure sensor 27 is connected to the hydraulic drive 28 and senses the hydraulic pressure in the hydraulic drive 28. The controller 24 receives data indicating the pressure in the hydraulic drive 28 from the pressure sensor 27 and makes a determination (or computes) of a force applied by the tool 10 on the workpiece which is described in more detail below. The controller 24 receives signals from the one or more operator controls 42, 44 to activate and deactivate the motor 18 which activates and deactivates the hydraulic drive 28, respectfully. When the controller 24 activates the motor 18, a work light 26 positioned on the main body 30 of the tool frame 12 may also be activated to illuminate an area of the working head 14 during a crimp cycle.

Figure 2:
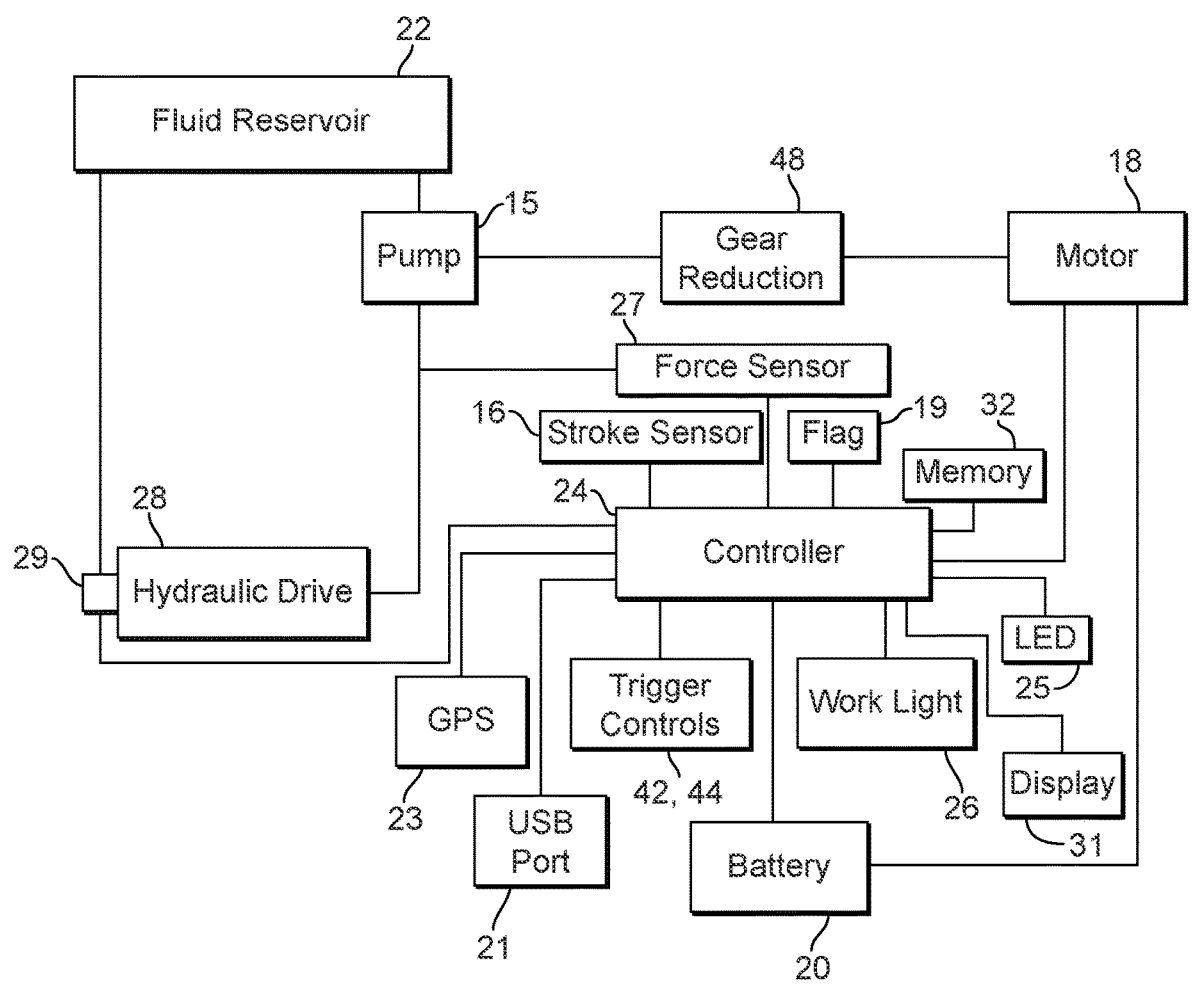
FIG. 2 is a schematic diagram illustrating a hydraulic drive and control system according to an embodiment of the disclosure.

Continuing to refer to FIG. 2, a relief valve 29 connects the hydraulic drive 28 with the fluid reservoir 22. According to one embodiment, the relief valve 29 is a mechanically actuated valve designed to open when a predetermined maximum pressure is reached in the hydraulic and control system 11. When the relief valve 29 is opened, fluid flows from the hydraulic drive 28 back to reservoir 22 relieving pressure in hydraulic drive 28 and removing the force applied on the workpiece by the actuator 60. A spring (not shown) may be provided as part of hydraulic drive 28 to return the actuator 60, e.g., the piston seen in FIG. 4, to a home position, shown in FIG. 3, when pressure in hydraulic drive 28 is relieved. It is noted that when the relief valve 29 opens, the relief valve 29 may make an audible indication, such as a "pop" like sound, that the relief valve 29 has opened.

The controller 24 monitors the pressure in hydraulic drive 28 to determine when a crimp cycle is complete. After actuating the motor 18 in response to activation of an operator control, e.g., trigger switch 44, the controller 24 monitors the hydraulic fluid pressure in the hydraulic system via the force sensor 27. When the relief valve 29 opens and the pressure in the hydraulic system drops below a predetermined minimum threshold, the controller 24 determines that a crimp cycle is complete. As shown in FIG. 1, an indicator light 25 is positioned on a top portion of the main body 30 of the tool frame 12 facing in the proximal direction so that it is visible to the tool user. The indicator light 25 is electrically connected to the controller 24. According to one embodiment, the light 25 is a bi-color LED that can be energized to illuminate in two distinct colors, such as red and green. However, other types of LED indicators may be used, such as a tri-colored LED capable of emitting red, green and yellow light. When the controller 24 determines that the crimp cycle is complete and that the hydraulic system has reached a predetermined threshold pressure, the controller 24 energizes light 25 to illuminate green to indicate a successful crimp. If the hydraulic system was not able to reach the predetermined threshold pressure during the crimp cycle, because, for example, there was insufficient battery power to reach the desired threshold pressure or because the pressure setting of the relief valve 29 is out of calibration, the controller 24 energizes the light 25 to illuminate red. It is noted that the present disclosure also contemplates that the controller 24 may activate a sound generating device (not shown) when the controller 24 determines that the crimp cycle is complete, and that the hydraulic system has reached a predetermined threshold pressure to indicate a successful crimp.

Referring again to FIGS. 1 and 2, in this exemplary embodiment, the flag switch 19 is electrically connected to the controller 24 and permits a tool user to store a data flag along with other cycle information about a particular cycle operation of the tool 10 in the memory 32. The flag switch 19 may be provided on the main body 30 so that a tool user can activate the flag switch 19 to set a flag in the cycle information associated with a cycle data record stored in the tool memory 32. Such a flag may be used to remind a tool manager and/or a tool user to review or insert comments into the cycle information associated with a particular crimping cycle, as will be explained below. In addition, the flag may represent that a failed crimp was noticed by the tool user.

Also electrically connected to controller 24 is a location sensor 23. The location sensor 23 may be a device to determine the location of the tool 10 based on radio frequency signals received from a global navigation system. Non limiting examples of global navigation system include the global navigation satellite system (GNSS), such as the Global Positioning System (GPS) or the Next Generation Operational Control System (OCX) operated by the United States government, the Global Navigation Satellite System (GLONASS) operated by the Russian government, the BeiDou Navigation Satellite System (BNS) operated by the Chinese government, the Quasi-Zenith Satellite System (QZSS) operated by the Japanese government, the Galileo Positioning System operated by the European Union, the India Regional Navigation Satellite System (NAVIC) or the like. As an example, if the global navigation system is the GNSS, the location sensor 23 would be a GNSS antenna module, such as the SAM-M8Q module manufactured by Ublox. The location sensor 23 may be located near the surface of the handle 40 of the tool frame 12, as shown in FIG. 1, to ensure that it can receive radio frequency signals from GNSS satellites. In another exemplary embodiment, the location sensor 23 may be located near the surface of the main body 30 of the tool frame 12. The location sensor 23 may also include other means for determining a location of the tool 10, such as a receiver capable of determining location information from radio frequency sources other than global navigation systems, including cellular phone network transmissions. The present disclosure also contemplates that a separate device may be used to provide the location information associated with a crimp. For example, a tool user may use the location service on their mobile smartphone to provide the location of the crimp. To illustrate, if a tool user has their mobile smartphone paired with a tool 10 after a crimp is formed the controller 24 may ping the smartphone to provide the location information, e.g., the latitude and longitude coordinates of the smartphone, to the tool 10. The location information would then be stored in the cycle data record in memory 32 of the tool 10.

Figure 10:
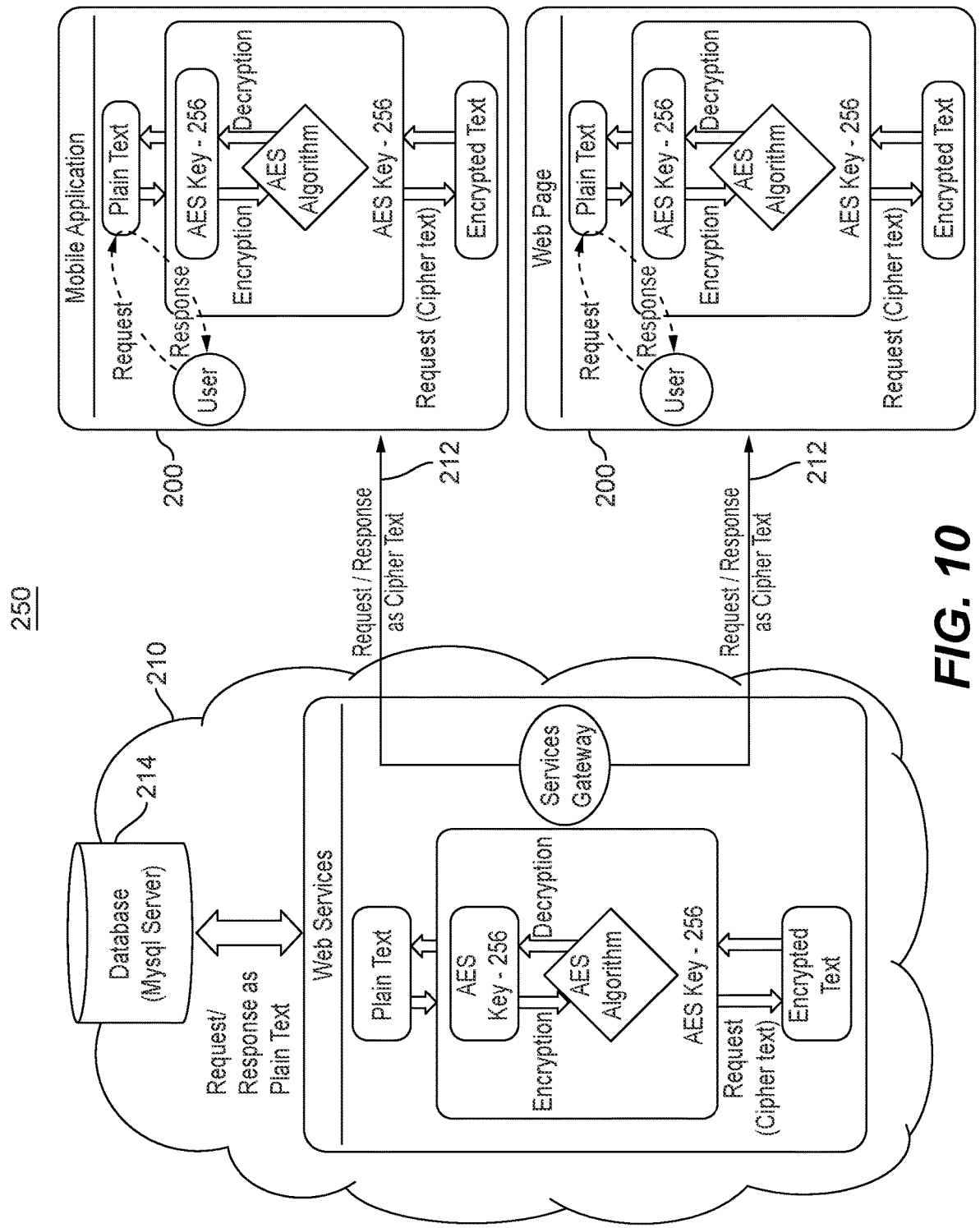
FIG. 10 is a block diagram of an exemplary embodiment of a computing system according to the present disclosure.

The controller 24 may be a microprocessor, microcontroller, application specific integrated circuit, field programmable gate array (FPGA) or other digital processing apparatus as will be appreciated by those skilled in the relevant art. The controller 24 communicates with memory 32 to receive program instructions and to retrieve data. Memory 32 may be read-only memory (ROM), random access memory (RAM), flash memory, and/or other types of electronic storage know to those of skill in the art. The controller 24 communicates with computing devices or computing system via a communication port 21, seen in FIG. 1. The communication port 21 may be physical connection, such as a USB port, a wireless communication interface, such as WiFi, Bluetooth, and the like, a removeable memory device, such as a SIM card or flash drive, or combinations thereof. Non-limiting examples of external networks include Wireless Local Area Networks (WLAN). Non-limiting examples of computing devices include desktop and laptop computers, tablets, smartphones, and devices that manage networks, such as devices that manage a WLAN and is connected to multiple communication ports 21, e.g., USB ports, on different tools 10 simultaneously. The computing devices 200 may also regularly monitor diagnostic information on the tool 10 and location information of the tool 10 and is capable of uploading this tool information to the web services 210, as seen in FIG. 10 and described below.

Continuing to refer to FIGS. 1 and 2, the battery 20 is removably connected to the bottom of the handle 40. In another embodiment, the battery 20 could be removably mounted or connected to any suitable position on the tool frame 12. In another embodiment, the battery 20 may be affixed to the tool 10 so that it is not removable. The battery 20 is preferably a rechargeable battery, such as a lithium ion battery, that can output a voltage of at least 16 VDC, and preferably in the range of between about 16 VDC and about 24 VDC. In the exemplary embodiment shown in FIG. 1, the battery 20 can output a voltage of about 18 VDC.

The handle 40 also supports the one or more operator controls, such as the trigger switches 42 and 44, which can be manually activated by a tool user. The handle 40 may include a hand guard 46 to protect a tool user's hand while operating the tool 10 and to prevent unintended operation of trigger switches 42 and 44. According to an embodiment of the present disclosure, one of the operator controls (e.g., trigger switch 44) may be used to activate the hydraulic and control system 11 while the other operator control (e.g., trigger switch 42) may be used to cause the hydraulic and control system 11 to deactivate so that the hydraulic drive 28 is depressurized.

Figure 3:
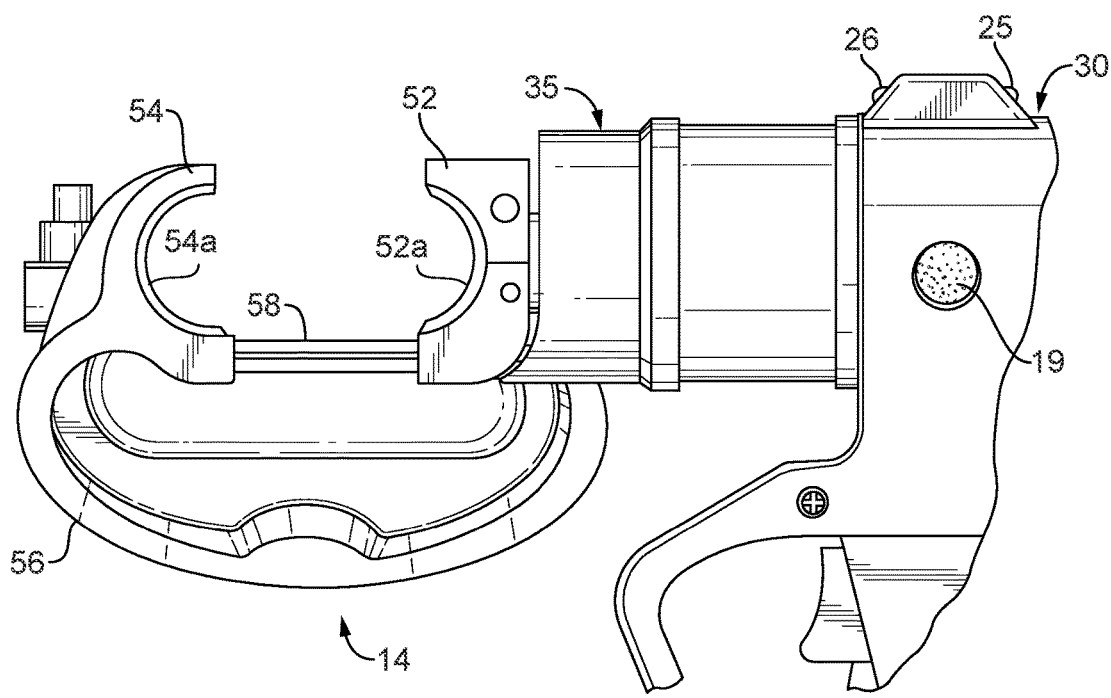
FIG. 3 is a side elevation view of a working head of the tool of FIG. 1 and a cross section of a portion of a main body of a frame of the tool of FIG. 1, illustrating a piston of the tool in a home position.
Figure 4:
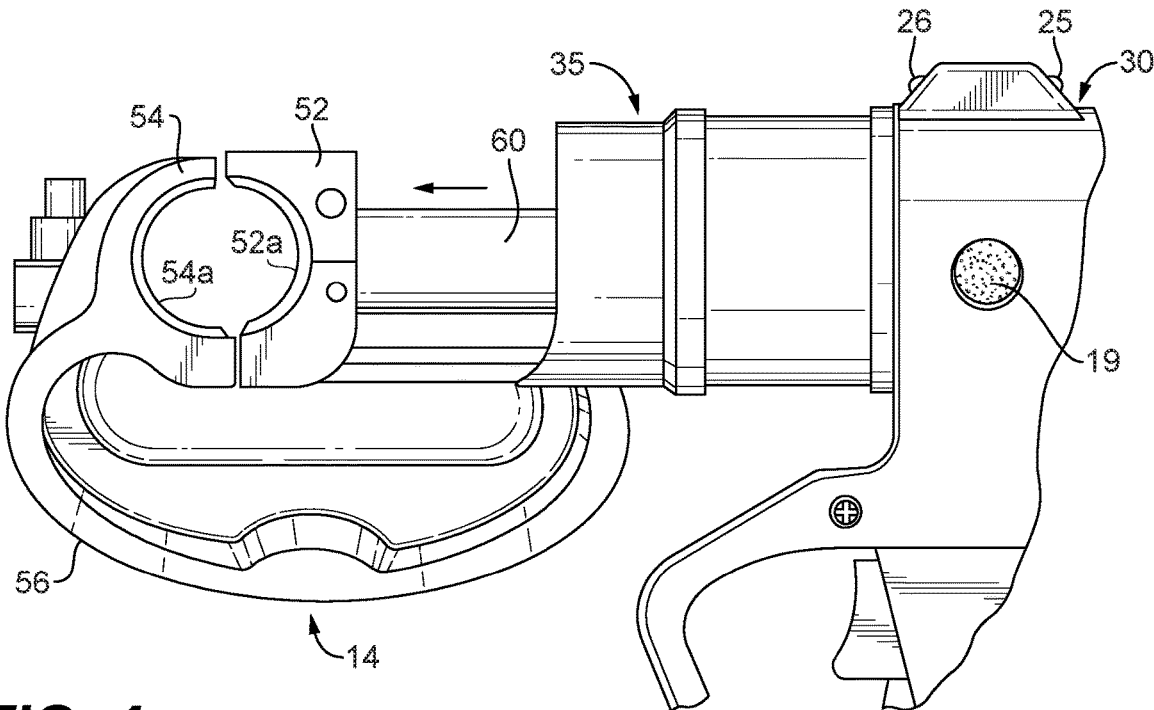
FIG. 4 is a side elevation view of the working head of the tool of FIG. 1 and a cross section of a portion of the main body of the tool of FIG. 1, illustrating the piston of the tool in an actuated position.
Figure 6:
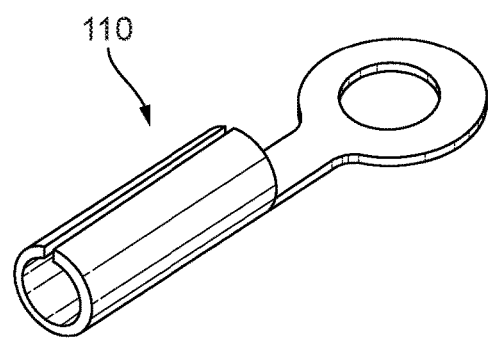
FIG. 6 is a perspective view of an exemplary embodiment of a lug connector that can be crimped using the tool of FIG. 1.
Figure 7:
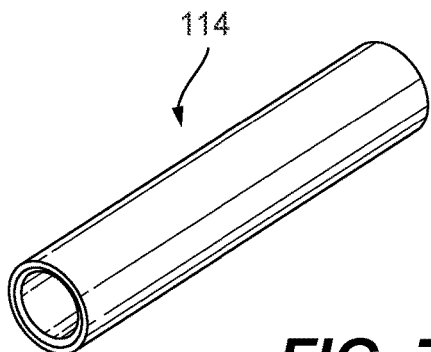
FIG. 7 is a perspective view of an exemplary embodiment of a splice connector that can be crimped using the tool of FIG. 1.

Referring now to FIGS. 1, 3 and 4 the working head 14 of the tool 10 will be described. The working head 14 includes an impactor 52, and anvil 54, an arm 56 and a guide 58. The impactor 52 has a working surface 52a and is configured to move between a home position, shown in FIG. 3, and a crimping position, shown in FIG. 4. The impactor 52 is configured and dimensioned to connect to or couple with the actuator 60 of the hydraulic and control system 11 within the main body 30 of the tool frame 12. In this exemplary embodiment, the actuator 60 is a piston and may also be referred to as the piston 60. As described above, in an exemplary embodiment, one of the trigger switches (e.g., trigger switch 44) may be used to activate the hydraulic and control system 11 by activating the motor 18 that causes the hydraulic pump 15 to activate via the gear reduction box 48 which pressurizes the hydraulic drive 28 to drive the piston 60 in the distal direction, as shown by the arrow in FIG. 4. Driving the piston 60 distally causes the impactor 52 to move to the crimping position and deliver force to the workpiece, e.g., lug connector 110 seen in FIG. 6, or splice connector 114 seen in FIG. 7 onto a conductor. The other trigger switch (e.g., trigger switch 42) may be used to cause the hydraulic and control system 11 to deactivate so that the hydraulic drive 28 is depressurized causing the piston 60 to retract in the proximal direction to the home position, shown in FIG. 3. As noted above, a spring (not shown) may be provided as part of hydraulic drive 28 to return the piston 60 to the home position when pressure in hydraulic drive 28 is relieved. The impactor 52 is operatively coupled to the guide 58 on the arm 56 of the working head 14 so that the impactor 52 can move along the guide 58 as the piston 60 moves the impactor 52 between the home and crimping positions. For example, when the piston 60 is driven in the distal direction, the piston 60 moves the impactor 52 along the guide 58 from the home position, seen in FIG. 3, toward the crimping position, as shown in FIG. 4.

The arm 56 has at its proximal end a ring 35 used to connect the working head 14 to the tool frame 12, as is known. In one exemplary embodiment, the working head 14 and the frame 12 may be permanently joined with one another via the ring 35. The ring 35 has a center aperture (not shown) through which the piston 60 passes in order to connect to the impactor 52. The distal end of the arm 56 includes or forms the anvil 54 such that the anvil is fixed in position. The anvil 54 has a working surface 54a. When a workpiece, such as a lug connector 110 or a splice connector 114, is placed in the working head 14 between the impactor 52 and the anvil 54, and a conductor or conductors are inserted into workpiece, the motor 18 of the tool 10 can be activated so that the piston 60 is driven from the home position toward the crimping position. As the impactor 52 moves toward the anvil 54 the workpiece may also move toward the anvil 54. When the impactor 52 and anvil 54 both contact the workpiece further movement of the impactor 52 causes the working surface 52a of the impactor 52 and the working surface 54a of the anvil 54 to deform the workpiece thus making the crimp. It is noted that the home position is when the impactor 52 is adjacent the ring 35 and the crimping position is when the impactor 52 and anvil 54 deform the workpiece.

To measure the force applied by the impactor 52 on the workpiece, the force sensor 27, which in this exemplary embodiment is a pressure sensor, is located in fluid communication with the hydraulic drive 28. When the piston 60 drives the impactor 52 distally until the impactor 52 is in the crimping position, the force applied by the impactor 52 onto the workpiece is monitored by the pressure sensor 27. According to yet another embodiment of the disclosure, the force sensor 27 may be located elsewhere, such as between the impactor 52 and the anvil 54, or between the impactor 52 and one of the die 100, seen in FIG. 5, or between the anvil 54 and one of the die 100 to measure force applied by impactor 52 on the workpiece. According to another embodiment, the force sensor 27 may be a strain gauge mounted on arm 56 and used to measure the force applied to a workpiece.

According to one embodiment, the impactor 52 and anvil 54 may be configured and dimensioned so that when the piston 60 pressed the impactor 52 into the anvil 54 the working surface 52a of the impactor 52 and the working surface 54a of the anvil form a crimp connection with the desired shape. According to another embodiment, the impactor 52 and/or anvil 54 may include surface features that allow die 100, such as the die shown in FIG. 5 to be releasably connected to the impactor 52 and the anvil 54. Each die 100 has a working surface 102 or 104. By using replaceable die, a variety of working surfaces, e.g., working surfaces 102 and 104, can be provided on the tool 10 to produce a variety of different shaped crimp connections. As an example, to splice two conductors together, the die 100, seen in FIG. 5, can be fitted onto the impactor 52 and the anvil 54. A splice connector 114, such as the one shown in FIG. 7, can be fitted onto the ends of the conductors (not shown) to be spliced. The splice connector 114 with the conductor ends can then be placed between the working surfaces 102 and 104 of the die 100 and the tool 10 is actuated causing the impactor 52 with one die 100 to move from the home position toward the crimping position. When the working surface 102 of one die 100 presses the splice connector 114 against the working surface 104 of the other die 100, the force applied by the impactor 52 compresses the splice connector 114 between the working surfaces 102 and 104 of the die 100 to form the crimp. To form the complete splice, multiple crimp operations may be required, depending on the configuration and dimensions of the conductor and the connector.

Figure 9:
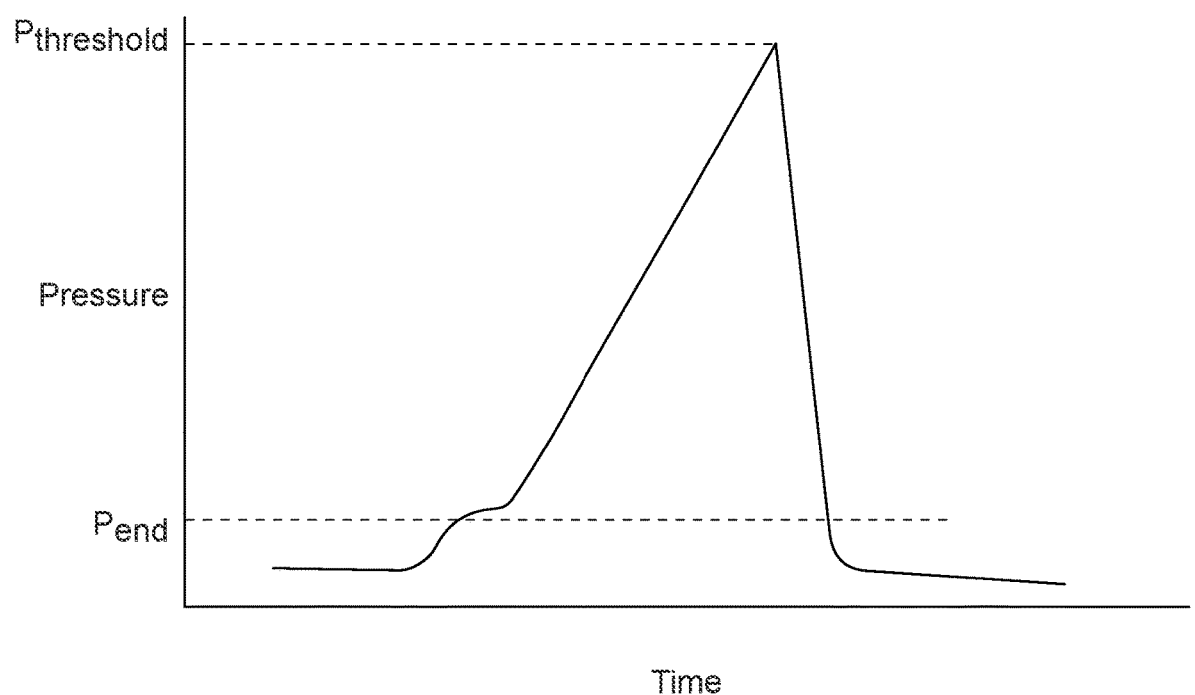
FIG. 9 is a graph illustrating pressure values generated by a tool forming a crimp connection as a function of time according to an embodiment of the present disclosure.

Referring now to FIG. 9, an illustrative example of the pressure in the hydraulic drive 28 as a function of time for a successful crimp cycle is shown. In this example, when the motor 18 is activated the pressure in the hydraulic system begins to rise and the piston 60 drives the impactor 52 toward the workpiece and the anvil 54. Once the impactor 52 contacts the workpiece pressing the workpiece against the anvil 54 and the workpiece begins to deform, the pressure in the hydraulic drive 28 rises steeply. When the pressure reaches a threshold pressure value $P_{threshold}$, the relief valve 29 opens causing the pressure in the hydraulic drive 28 to drop. When the pressure drops below a threshold minimum value $P_{end}$ the controller 24 determines that the crimp cycle is complete. Controller 24 then activates light 25 to illuminate green if $P_{threshold}$ was reached during the crimp cycle. If the pressure were to drop below $P_{end}$ without having achieved $P_{threshold}$ during the crimp cycle, the controller 24 would activate light 25 to illuminate red, indicating a potentially defective crimp connection. As a non-limiting example, the threshold minimum pressure $P_{end}$ may be about 8,500 psi and the threshold pressure $P_{threshold}$ may be about 9,000 psi. According to a further embodiment, instead of providing a mechanical relief valve 29, an electrically operated relief valve electrically connected to the controller 24 may be provided. According to this embodiment, the controller 24 monitors the pressure in the hydraulic drive 28 based on a signal from the pressure sensor 27 and opens the relief valve 29 when that pressure reaches the predetermined threshold value $P_{threshold}$ ending the crimp cycle. As in the previous embodiment, if the pressure reaches $P_{threshold}$ during the crimp cycle, the light 25 is illuminated green. If the predetermined threshold value $P_{threshold}$ cannot be reached after a predetermined period of time, e.g., 5 seconds, the controller 24 will end the crimp cycle by turning power to the motor 18 off and the controller 24 would activate light 25 to illuminate red, indicating a potentially defective crimp connection.

According to yet another embodiment, a stroke sensor 16, seen in FIG. 2, may be provided. The stroke sensor 16 determines when piston 60 has reached the end of its range and/or that the working surfaces 102 and 104 of the die 100 are at their closest approach. When the working surfaces 102 and 104 of the die 100 are at their closest approach, the space defined by the working surfaces 102 and 104 of the die 100 forms the desired shape of the finished crimp connection. The controller 24 monitors the stroke sensor 16 and when the piston 60 is at the end of its range, the controller 24 opens the relief valve 29 completing the crimp cycle. The controller 24 may also monitor the pressure sensor 27, and as with the previous embodiments, the light 25 is illuminated either green or red, depending on whether the threshold pressure $P_{threshold}$ was reached during the crimp cycle.

According to a further embodiment, the force sensor 27 may be a load cell that monitors the force applied to the workpiece during the crimp cycle. The force measurement by the load cell 27 may be used by the controller 24 instead of (or possibly in addition to) the pressure monitored by a force sensor 27, e.g., a pressure sensor, to determine whether sufficient maximum force is applied during a crimp cycle. The force sensor 27 may be a load cell that is positioned between the impactor 52 and the anvil 54, or between the impactor 52 and one of the die 100 or between the anvil and one of the die 100.

Figure 5:
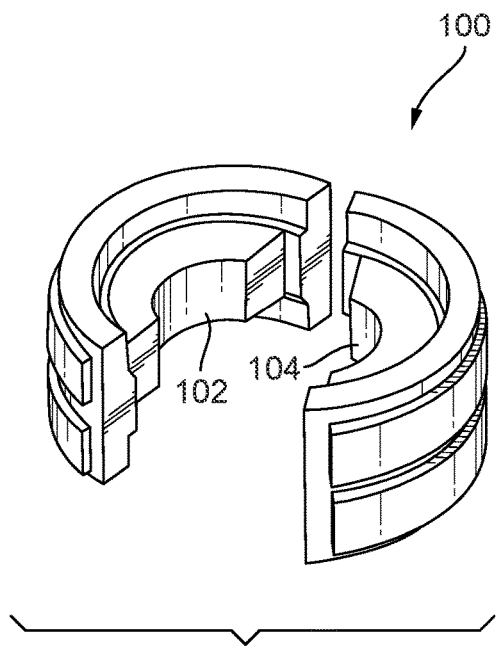
FIG. 5 is a perspective view of an exemplary embodiment of dies that can be used with a tool of FIG. 1.

In operation, a tool user selects an appropriate die, such as die 100 shown in FIG. 5, to form a desired crimp connection. The tool user selects the workpiece, which in this exemplary embodiment is a lug connector 110 or splice connector 114, for connection to a conductor. The tool user prepares the conductor, for example, by cutting it to length and removing insulation on the end to be crimped and fits the workpiece onto the conductor. The tool user places the workpiece and conductor between the die faces 102 and 104 of the die 100 and presses trigger 44 to actuate the hydraulic and control system 11. More specifically, when the trigger 44 is pressed, the controller 24 turns on the motor 18 causing the pump 15 to pressurize the hydraulic drive 28 which moves piston 60 distally. Movement of the piston 60 distally moves the impactor 52 from the home position to the crimping position. When the piston 60 is in the crimping position, the impactor 52 delivers a crimping force to the workpiece so that the impactor 52 and anvil 54 deform the workpiece to crimp the conductor to the workpiece. According to one embodiment, the pressure in the hydraulic drive 28 rises as the workpiece is being deformed. When the pressure reaches the predetermined threshold value $P_{threshold}$, the relief valve 29 opens causing the pressure to drop below the minimum threshold value $P_{end}$. In response, the controller 24 determines that the crimp cycle is complete. With the crimp cycle complete, the controller 24 determines and stores the cycle information in memory 32 as a cycle data record. For example, the controller 24 determines the geographic location where the crimp was formed based on signals from the location sensor 23. This location information may be in the form of a latitude, longitude and/or altitude where the crimp was formed. The controller 24 determines the time stamp in the form of time and date when the crimp was formed. The controller 24 also determines the maximum force that was applied to the workpiece during the crimping operation by analyzing signals received from the force sensor 27, which in this exemplary embodiment is a pressure sensor. This cycle information is then stored in memory 32 as a cycle data record, similar to that shown in FIG. 8. According to another exemplary embodiment, instead of or in addition to recording the maximum force, the controller 24 may record a series of forces or pressures applied as the crimp is formed, as shown by the graph of FIG. 9. If the tool user decides that further information about a last attempted crimp cycle should be provided, for example, because the tool user was cycling the tool 10 without actually forming a crimp, or because the tool user determined that a crimp was faulty and replaced it with a new crimp, the tool user can activate the flag switch 19, seen in FIG. 1, causing the controller 24 to add a data flag to the cycle data record of that particular crimp operation, as seen in row 1 of FIG. 8 described below.

Referring to FIG. 8, an example of cycle data records of cycle information stored in memory 32 is shown. The cycle data records are illustrated here by a table of data arranged in rows, but a variety of data structures known to those with skill in the relevant field could be used. In this embodiment, each row records cycle information for a particular crimp cycle of the tool 10. In the first column of the table an index number is stored. According to one embodiment, the index number is indicative of the particular crimp cycle performed by the tool out of the total number of cycles the tool 10 has made and serves to uniquely identify each crimp cycle recorded. The index number may also be used to determine if the tool 10 needs to be recalibrated according to a maintenance schedule. The next column records the maximum force, e.g., pressure, applied or a maximum hydraulic pressure achieved by the hydraulic drive 28 during the crimp cycle. Alternatively, instead of recording a maximum force or pressure, a logical value (e.g., "Pass" or "Fail") indicating that sufficient pressure was or was not achieved during the crimp cycle could be recorded. The next columns record the location of the tool 10 when the crimp is formed, i.e., at the completion of a crimp cycle. According to one embodiment, the tool location is recorded as a latitude and longitude. According to a further embodiment, the altitude of the tool 10 may be recorded so that if the tool 10 is used a floor of a building, the floor of the building where the crimp was made can be determined by the altitude. The next two columns record the time stamp associated with when the crimp cycle was completed or activated. In the exemplary embodiment of FIG. 8, the time stamp includes the time and date when the crimp cycle was activated. The next column holds a flag that may have been added to the data record by activating the flag switch 19, seen in FIGS. 1 and 2, following a crimp cycle. In the embodiment illustrated in FIG. 8, the first cycle data record includes a flag. For each subsequent cycle of the tool 10, a new cycle data record of cycle information is added to memory 32, as illustrated by a new row of the table. The next column holds alpha-numeric comments that may have been added to the data record by the tool user, such as "crimped failed due to user error." The present application also contemplates that the comments may include crimp location information or other information that may confirm or help with the location of crimps formed by a particular tool.

Referring now to FIGS. 10-17, the cycle information and other tool information stored in memory 32 of one or more tools 10 can be communicated or transmitted to one or more computing devices 200 paired with the one or more tools 10 via the communication port 21 of each tool 10, seen in FIG. 1. The one or more computing devices 200 may then communicate or transmit the cycle information and other tool information to a cloud computing services 210. The one or more computing devices 200 and the cloud computing services 210 may form part of an overall computing system 250, seen in FIG. 10. For ease of description, the cloud computing services 210 may also be referred to herein as the "web services." Communicating the cycle information and other tool information to the computing devices 200 and/or web services 210 permits tool managers and tool users to manage one or more tools 10, to manage one or more tool users and/or to manage crimps formed by the one or more tools 10. The computing devices 200 and/or web services 210 may also regularly monitor tool diagnostic information, such as temperature information or warnings, information indicating that a particular tool 10 is no longer detected within the computing system network 250, information indicating that a particular tool 10 has repeatedly failed recent crimps, and/or cycle dwell time on the one or more tools 10 and track the location of the tool 10.

The cycle information stored in memory 32 of each tool 10 can be communicated to the computing devices 200 using wireless or wired networks. A non-limiting example of a wireless network includes a Wireless Local Area Networks (WLAN) 212. Non-limiting examples of computing devices 200 include desktop and laptop computers, tablets, mobile smartphones, and devices that manage networks, such as devices that can manage a WLAN that can be connected to multiple communication ports 21 on different tools 10 simultaneously.

The computing devices 200 and/or web services 210 may also include operations or functions that can notify tool 10 managers and/or tool users about pertinent changes to tools 10 paired with or connected to the computing system 250 via a display message, a SMS text message, an email or other alert. Pertinent changes may include, but are not limited to, diagnostic information about one or more tools 10, such as temperature information or warnings, information indicating that a particular tool is no longer detected within the network, e.g., the tool is no longer detected by the WLAN, or information indicating that a particular tool has repeatedly failed recent crimps.

Referring again to FIG. 10, one such computing device 200 may be a smartphone running an application (also known as an "App") used to store, display and analyze the cycle information and other tool information. The application running on the smartphone may also be referred to herein as the "App". Such an App may provide the tool manager and/or tool user with the ability to review one or more cycle data records and to add additional information, e.g., alpha-numeric text comments or notes, to the cycle data record of a crimp including a data flag. The computing devices 200 either alone or in combination with the web services 210 may also perform data processing functions to analyze and display the cycle information and other tool information. These functions may include filtering cycle information to identify, for example, crimps formed at particular job sites, crimps formed between particular dates and times, or crimps where the maximum force is less than a predetermined threshold value. The data processing functions may also include generating a geographic map or a satellite based image of a geographic location showing the locations of the crimps formed by the tool 10. Filtering criteria may also be used to display only a subset of crimps, such as crimps where the maximum force applied to form the crimp was insufficient representing crimps that failed.

In the exemplary embodiment of a computing system 250 shown in FIG. 10, the computing system 250 includes cloud based web services 210, such as the AWS provided by Amazon.com Inc., a computing device 200, e.g., a mobile smartphone, running a mobile App connected to a tool management application running on the web services 210 and a laptop computer 200 running a browser connected to the tool management application running on the web services 210. When the tool 10 communicates with the computing device 200, e.g., a mobile smartphone, over Bluetooth, the smartphone 200 preferably transfers cycle information and other tool information using AES-128 bit encryption. When the computing device 200, e.g., a mobile smartphone, uploads this cycle information and other tool information to the web services 210, the smartphone uses AES-256 bit encryption. Additionally, the web services 210 may use a .Net 4.6 framework to communicate with the mobile Apps residing on the mobile computing devices 200 and the web services database 214, as well as any push notifications. The web services based tool management application may utilize HTML5, CSS, Bootstrap 4, JQuery 3.4.1 to support the user interface with the web services and functions. The web services server uses RDS-MySQL 6.07 database 214, EC2 for web hosting, S3 for FTP, Enabled Apple and Android Push notifications.

Figure 11:
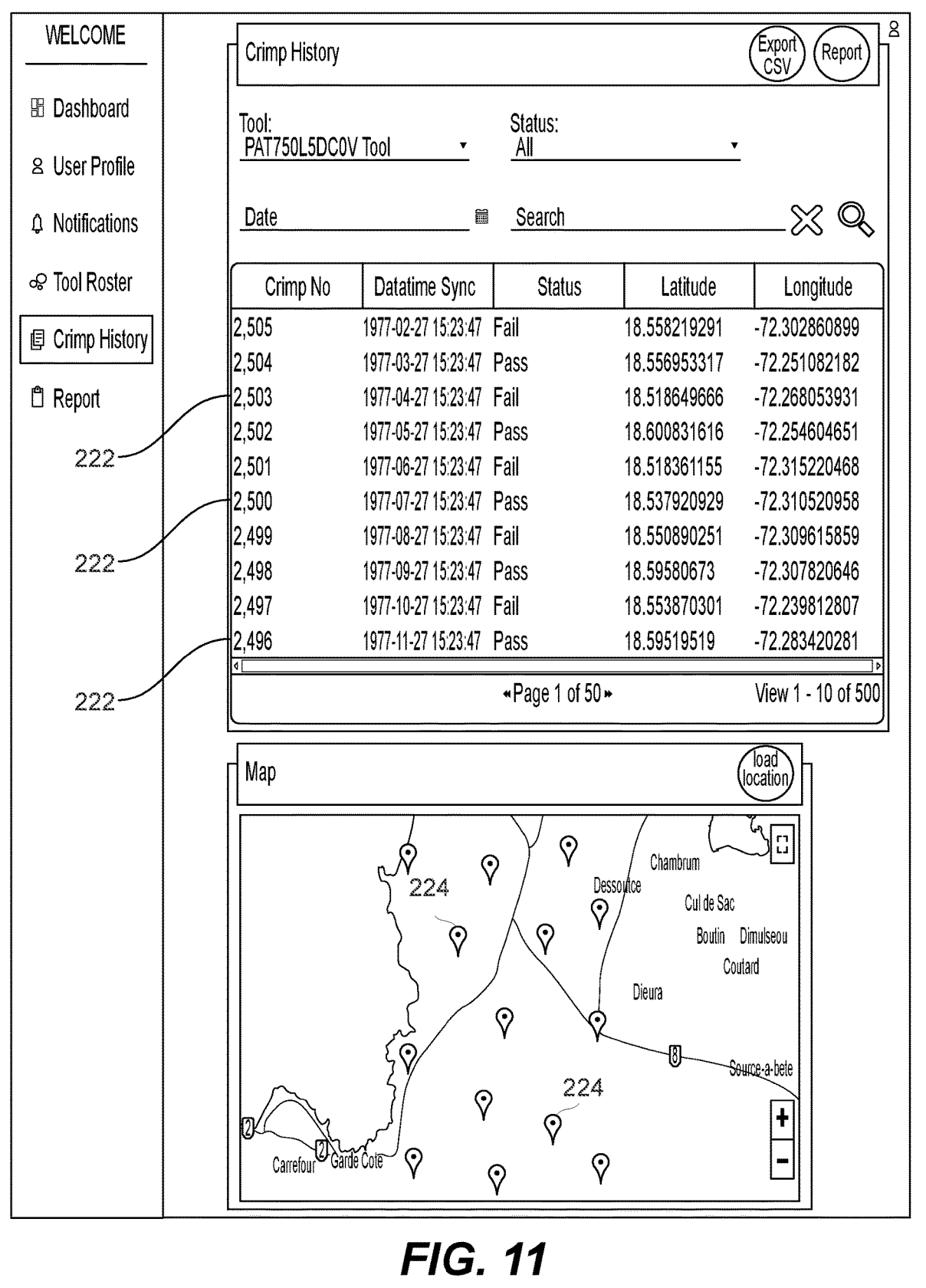

Referring to FIG. 11, an exemplary page display of a computing device 200, such as a laptop computer, connected to the tool management application running on the web services 210 via a browser is shown. In this example, cycle information and other tool information for one or more tools 10 has been transferred into the web services database 214 via, for example, a computing device 200 running the mobile App. For example, a vendor of electrical installation services (a tool manager) may have cycle information and other tool information from each of the technicians (a tool user) working on its projects transferred into the web services database 214, or a project manager (a tool manager) for a building site may have cycle information and other tool information from a number of vendors (tool users) transferred into the web services database 214. This cycle information and other tool information may be used to check the quality of the work being performed and to track the progress of the work. The cycle information and other tool information from the web services database 214 may be displayed in a window titled "Crimp History" of a web page loaded into a computing device 200, e.g., a laptop computer, which is connected to the tool management application running on the web services 214 via a browser. This cycle information and other tool information in the Crimp History may be presented as a table showing an index number for each crimp, e.g., "Crimp No.," a time stamp for each crimp, e.g., a date and time for each crimp, a crimp "Status" identifier showing whether sufficient pressure or force was applied to form the crimp. The crimp Status may be logical value that may be presented as a "Pass" or "Fail" or the crimp Status may be represented as the pressure or force applied to form the crimp, and the location where the crimp was formed, in for example, the latitude and longitude of the tool 10 when the crimp was formed.

Continuing to refer to FIG. 11, a user can filter the cycle information displayed by the computing device 200, e.g., a laptop computer, of the computing system 250 by entering filter criteria. Non-limiting examples of filter criteria include the identity of a particular tool 10 in a "Tool" field, tools with a particular status in a "Status" field, a date crimps were made in a "Date" field, and a user defined alpha-numeric search in a "Search" field. To illustrate, if a user selects or enters a particular tool 10 in the "Tool" field, such as the "PAT750L5DC0V" tool, as seen in FIG. 11, each of the cycle data records 222 of cycle information formed by that tool 10 would be displayed in the Crimp History window. In this exemplary embodiment, the cycle information displayed for each cycle data record 222 includes a time stamp, whether the crimp was formed with sufficient force, indicated by a logical Pass or Fail status value, and the location where the crimp was formed. According to one embodiment, the designation whether the Status field of a cycle data record has a Pass or Fail status may be indicated by the color of the typeface (or font) used to display the cycle data record 222, for example, a green font may be used if the status is Pass and a red font may be used if the Status is Fail. A wide variety of filter criteria can be applied to filter the cycle information stored in the web services database 214 for presentation to the tool manager or the tool user. For example, a tool manager or tool user could query the web services database 214 to show only cycle data records 222 which have a Status of "Fail," or to show cycle data records formed within a date or time range, or to show cycle data records 222 formed within a certain geographic range, and the like. Other display windows (not shown) could be provided to allow a user to enter Boolean logic operators (AND, OR, NOT, etc.) to combine filters using techniques known to those of skill in the relevant field could also be applied.

Figure 12:
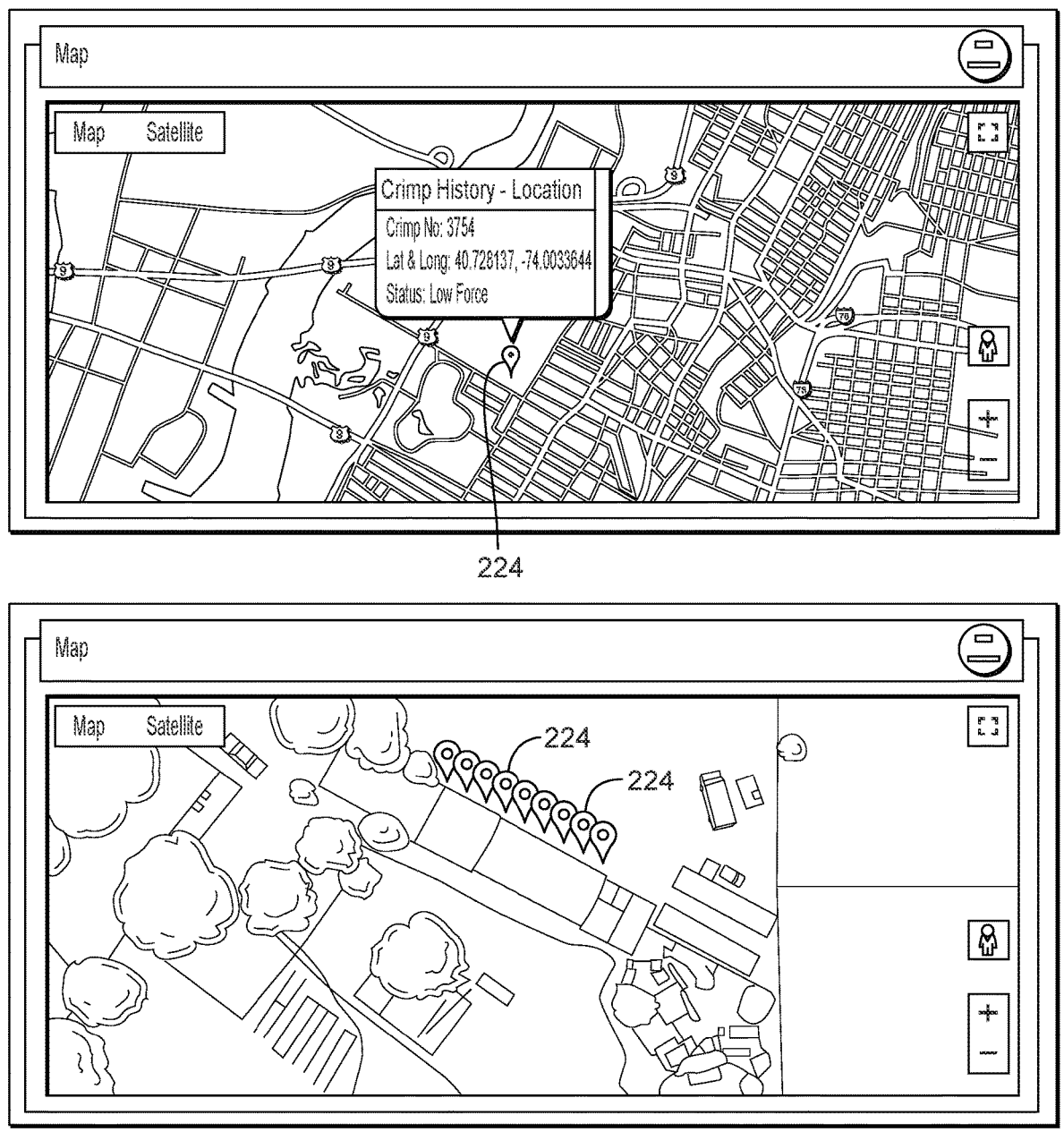
FIG. 12 is another graphic illustration of a computing device display according to an exemplary embodiment of the present disclosure.

According to one embodiment, the cycle information retrieved from the web services database 214 based on the selected or entered filter criteria can also be displayed graphically on a map, as seen in FIGS. 11 and 12. In the exemplary embodiment of FIGS. 11 and 12, the location of each of the crimps for tool PAT750L5DC0V (that fit the filter criteria) are overlaid on the map. Icons 224 can be used to display the location of the crimps on the map. The icons 224 may have a typographic designation or color coding, e.g., Green or Red, to show that the particular crimp has a "Pass" or "Fail" status. The map may include landmark information, such as the location and names of towns, streets, power lines, transmission towers, buildings and the like to provide the tool manager or the tool user with information to show the location where crimps or other tool operations were performed. According to one embodiment, the cycle information from multiple crimps and/or other tool operations can be used to track progress on a job site, grounding grids, or other work sites. According to another embodiment, instead of providing a map showing the locations of crimps, the web services 210 can analyze the cycle information to determine a street address of the job site where the crimps where formed. The street address of the crimp could be provided as text.

Figure 13:
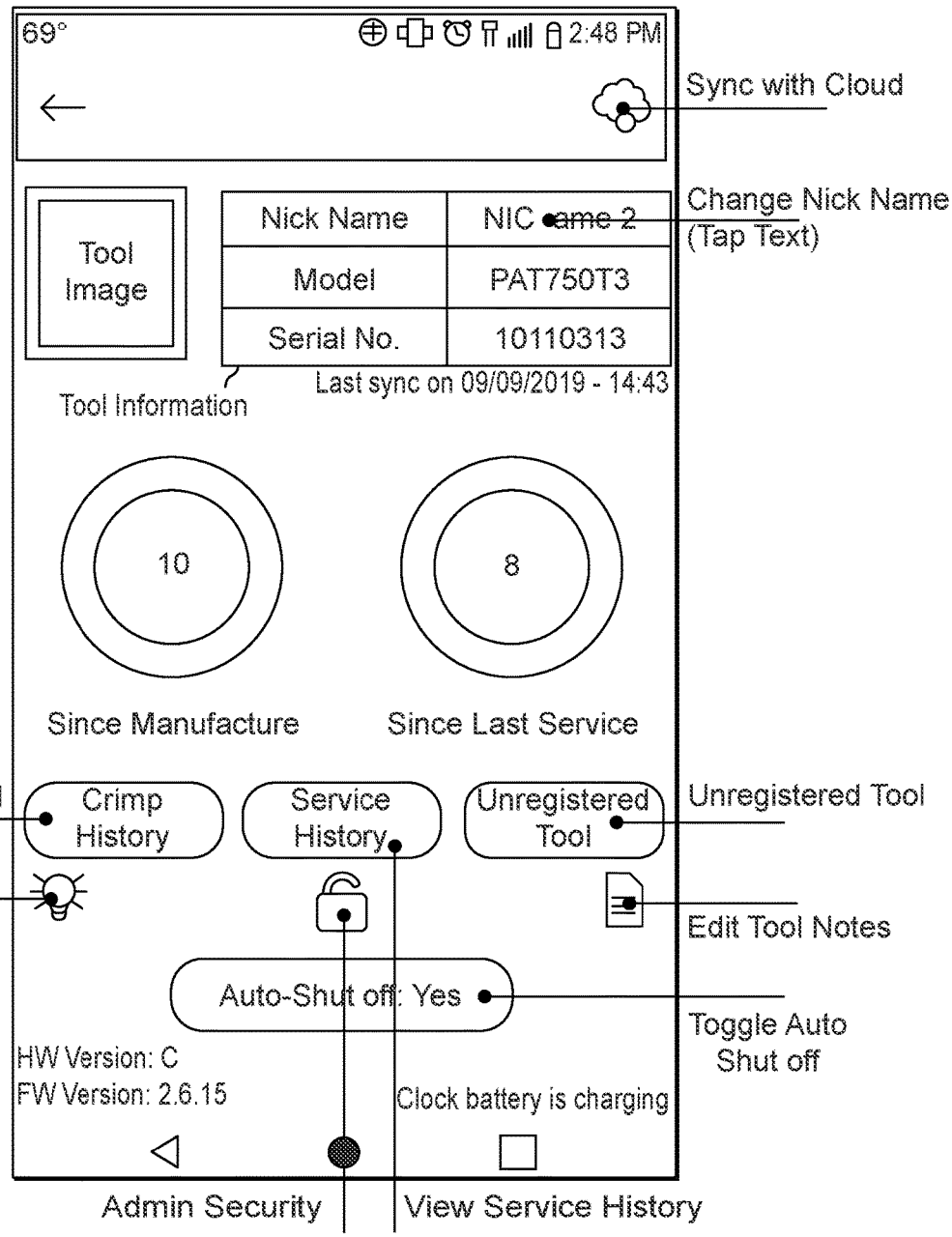
FIG. 13 is an exemplary rendering of a home page of an exemplary embodiment of an App running on a computing device forming part of a computing system used to manage the operation of one or more tools according to the present disclosure.

Referring now to FIGS. 13-17, the operation of an exemplary embodiment of a mobile app running on a smartphone as a computing device 200 will be described. As shown in FIG. 13, after the App is connected to the tool 10, an exemplary tool information page of the App is displayed on the smartphone display. Selecting the "Sync with Cloud" icon initiates a sync operation between the App and the web services 210 of the latest cycle information associated with the tool 10 identified in the "Tool Information" fields. Selecting the "Change Nick Name" field permits the tool manager or tool user to assign an identifier to each unique tool 10 paired with the App and identified in the Tool Information fields. Such identifiers may include, but are not limited, to the user's custom serialization number, the owner of the tool 10, the number of the truck in which the tool 10 is stored. Selecting the "Crimp History" icon displays the page shown in FIG. 12. The crimp history page presents cycle information as a list of cycle data records 222 with an index column "Crimp No.," a time stamp column "Date & Time," and an "Output Force" column. In this exemplary page, the tool manager or the tool user can filter the records by date by selecting the "Calendar" icon to list cycle data records 222 for a particular tool 10 identified in the Tool Information fields, seen in FIG. 13, to display only those cycle data records from the selected date or date range. The column headers, namely the "Crimp No." and the "Output Force" headers, can be selected (e.g., tapped) to toggle between ascending or descending order of crimp numbers, or to filter crimps to those that have an Output Force of Pass or Fail. The Crimp History page may or may not include additional icons to represent the cycle information associated with each cycle data record 222. For example, and referring to FIG. 16, an icon 216 may be used to represent whether the tool 10 successfully recorded in memory 32 the location where the crimp was formed, an icon 218 can be used to represent whether or not there are comments saved for a particular cycle data record 222, or an icon 220 used to represent whether or not the cycle data record 222 includes a flag.

Figure 14:
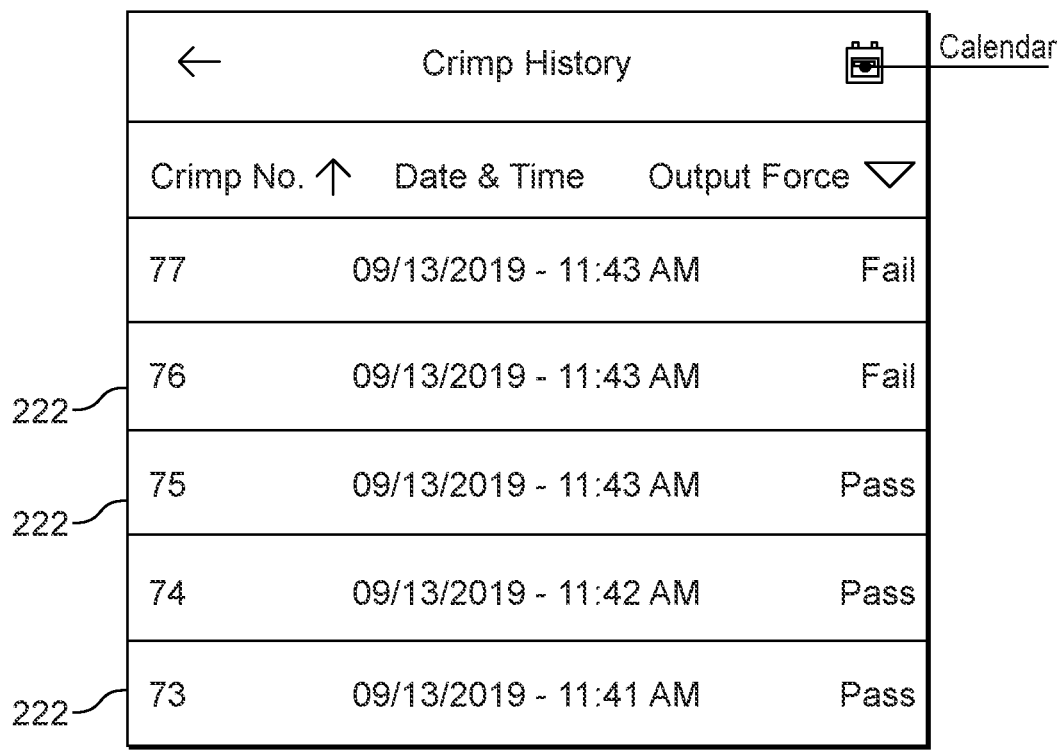
FIG. 14 is an exemplary rendering of a crimp history page of an App running on a computing device forming part of a computing system used to manage the operation of one or more tools according to the present disclosure.
Figure 15:
FIG. 15 is an exemplary rendering of a crimp comment page of an App running on a computing device forming part of a computing system used to manage the operation of one or more tools according to the present disclosure.

If an individual cycle data record 222, e.g., the Crimp No. 76 row of the cycle information displayed in FIG. 14, is selected by the tool manager or tool user, the cycle data record 222 for Crimp No. 76 would be presented on the display of the mobile computing device 200, as seen in FIG. 15. From this window, the tool 10 manager or tool 10 user is able to review existing comments associated with the cycle data record or enter new comments about the selected cycle data record. It is noted that these comments can also be reviewed, entered and edited through the laptop computer as a computing device 200 running on a browser connected to the tool management application running on the web services 210.

Referring again to FIG. 13, if the tool manager or the tool user selects the "Service History" icon, the page shown in FIG. 17 is displayed. In this exemplary embodiment, the tool manager or the tool user can review, analyze and manage one or more tools 10 using the service history of the one or more tools 10 with service history records stored in the web services database 214. As described above, cycle information about one or more tools may be uploaded to the web services database 214. In addition, service history information associated with the one or more tools may also be added to the web services database 214 using a computing device. The cycle information and service history information for each tool may then be used when displaying the Service History. As shown in FIG. 17, each service history data record may include, for example, a unique tool identification number as a "Tool Event," the total number of crimps performed by the specific tool at the time of service as a "Total Crimps at Service," and a time stamp as "Date & Time." Through the Service History page, the tool manager or the tool user can filter service history data records by date by selecting the "Calendar" icon in the top right of the page to display only those service history data records from the selected date. One or more column headers, which in this example the "Service No." headers, can be selected (e.g., tapped) to toggle between ascending or descending service numbers.

Referring again to FIG. 13, if the tool 10 manager or the tool 10 user selects the "Unregister Tool" icon, the tool 10 manager or the tool 10 user can unregister the tool 10 from the users account in the computing system 250. If the tool 10 manager or the tool 10 user selects the "Activate Light" icon, an instruction is sent from the computing device 200 to the tool 10 which is received at the communication port 21 and processed by the controller 24. The controller 24 then activates the work light 26 on the tool 10, seen in FIG. 1, causing the work light 26 to illuminate. The work light 26 can illuminate for a continuous period of time or the work light 26 can blink two or more times so that the tool 10 can be located by the tool manager or the tool user. For example, activating the work light 26 as described can be used to easily and quickly determine which tool 10 the computing device 200 is connected to, as well as it can assist with locating the tool 10 if it is lost in a dark area. If the tool manager or the tool user selects the "Admin Security" icon, the App running on the computing device 200 can toggle between a "secured" operation mode and an "unsecured" operation mode. In the "secured" mode, only the tool manager or the tool user who has registered the tool 10 with the web services 210 or others authorized by the tool manager or the tool user to access the tool manager's or the tool user's account, is able to connect to the tool 10 and view, comment, and/or sync cycle information with the web services 210. In the "unsecured" mode, anyone with a computing device 200 running the App can connect to the tool 10 to view, comment and/or sync cycle information with the web services 210. If the tool manager or the tool user selects the "Edit Tool Notes" icon, a text field is presented by the App that allows the user to input alpha-numeric comments about the tool 10 identified in the Tool Information fields. An icon also allows the user to cancel their comments. This feature supplements the flag comments that may be entered which are focused on particular crimps. The inputted comments could be used to record instances when the tool 10 was dropped, notes about where and how the tool 10 should be stored, names, dates, or purchasing information. If the tool manager or the tool user selects the "Auto-Shut off" icon, the App running on the computing device 200 can toggle between "off" and "on" modes. In the "off" mode, the tool 10 operates such that whenever an operator control, e.g., trigger switches 42 or 44, is activated the motor 18 activates and whenever the operator control, e.g., trigger switches 42 or 44, is deactivated the motor 18 deactivates. In the "on" state, after the operator control is activated so that the motor 18 is activated to begin a crimp cycle, when the controller 24 determines the crimp cycle is complete the controller 24 automatically deactivates the motor 18 to prevent the tool 10 from re-pressurizing after the relief valve 29 has released. This mode reduces energy consumption from the battery 20, reduces the force needed to trigger the return operator control, e.g., trigger switch 42, limits the wear on the tool 10, can initiate an auditory and/or tactile notification to the tool user the crimp cycle has completed, and can initiate the visual indication from the light 25 as described above.

The App running on the computing device 200 may also include "Frozen Timer" and "Job Scheduling" operations. With the Frozen Timer operation, a tool user can specify an amount of time on their account for which the tool can remain unconnected to a paired computing device 200 before being deactivated or frozen ("Time-to-Freeze"). This Time-to-Freeze may be entered in units of days, weeks, months or combinations thereof. A page may be presented to the tool user with a field that allows the tool user to input an integer to set the Time-to-Freeze, or the tool user may be presented with preset selections, such as "no time, 1 week, 1 month, or 3 months." When the user's account has a Time-to-Freeze set, whenever a tool 10 connects to a computing device 200, e.g., a mobile device, paired with or logged into the registered account for that tool, the tool 10 will check the current date and determine an end date ("Freeze Date") based on the Time-to-Freeze. For example, if a tool user has set the Time-to-Freeze for 1 week and pairs the App to a tool 10 on October $1^{st}$, the tool 10 will determine the Freeze Date as October $8^{th}$. Thereafter, whenever a battery 20 is installed in the tool 10 and an operator switch, e.g., trigger switch 44, is activated, the controller 24 in the tool 10 compares the current date to the Freeze Date. If the current date is after the Freeze Date, which in this exemplary embodiment is after October 8$^{th}$, the tool 10 will be rendered "frozen" so that the controller 24 will not activate the motor 18 in response to the operator control being activated. In some embodiments, the tool 10 may provide the tool user with visual or audible feedback that the tool has been rendered inactive, such as by flashing the LED 25 and/or the work light 26 or by generating a sound. If the tool 10 is in the inactive mode the tool can be returned to the active mode the next time the tool 10 is paired with the computing device 200 registered for that tool 100 and syncs the tool's cycle information with the web services database 214, which then set a new Freeze Date.

With the Job Scheduling operation, an operator can upload a file using a mobile application or web browser to the web services database 214 containing information about a job or project that is scheduled to be performed for a particular tool 10. This file may be in a format such as .txt, .xls, or .csv. In another embodiment, the operator may be able to enter job scheduling details directly into the computing system database 214 using a computing device 200 logged into the Tool Application website without uploading a standalone file. The web services 210 functions on the database 214 will parse through the file to determine details about the job to be done and creates a data object with the job details. For ease of description, the data object may also be referred to herein as the Job File. The Job File can be modified. The details of the Job File include but are not limited to: Job Name, Job Location, Employee performing the Job, Expected Start Date, Expected End Date, and List of Tasks, with each Task having a Task Number, Task Name, and an Expected Number of Crimps. The user can then assign this job to a particular tool or tools 10 in the web services database 214. When a user connects to the tool 10 scheduled for the particular job via the communication port 21 an indicator on the display of the computing device is rendered or activated indicating that this tool has been assigned a Job. The user can elect to view or start the job. When viewing the job, the user can see all the details stored in the Job File. Once the user elects to start the job, the device records the Actual Start Date and Time to the Job File. The display on the computing device 200 then shows a new page or window which may show, for example, a Task Number, a Task Description, the Expected Number of Crimps, and a numeric counter labeled as Crimps Since Task Start. When the user makes the first crimp in a task, the computing device 200 will automatically add an alpha-numeric text comment to that crimp indicating that the task has been started, e.g., "[Task Number] [Task Name] started". As the user performs crimps, the Crimps Since Task Start counter increments accordingly. Once the user has completed the task, the user can select a button labeled "Next Task" on the computing device 200 to advance the display to show the next Task page or window. Crimps Since Task Start will be recorded to the respective Task in the Job File. The computing device 200 automatically adds the comment to the latest crimp "[Task Number] [Task Name] completed." On the computing device display, the Task Number, Task Description, Expected Number of Crimps, will be updated to the next sequential task in the Job File, and Crimps Since Task Start will reset to zero. Once the user has advanced to the last task in a Job File, a button labeled "End Job" replaces the button labeled "Next Task" on the computing device display. Once "End Job" is selected, the computing device 200 records the Actual End Date and Time into the Job File. The computing device 200 automatically adds the comment to the latest crimp "[Task Number] [Task Name] and [Job Name] completed." Then the tool 10 returns to normal use. In some embodiments, while in the middle of performing a task, the computing device 200 may allow the user to elect to pause a job. Crimps made during the pause are not counted towards the task currently displayed on the computing device 200, but the crimps are added to the tool's crimp history. In addition, the computing device 200 automatically sets the flag and adds a comment to any crimps made during this pause such as "Task was paused during this crimp". When the web services 210 generates a report for this tool 10, the user may select to generate the report for a Job File rather than Start and End Dates. The generated report may show overall information from the Job File, and may determine a score for each task based on the number of crimps made vs the expected number of crimps. The report may also show a normal report output for all the crimps that were made between the Actual Start and End Date and Times.

According to a further embodiment, non-hydraulic mechanical crimping tools may also be equipped to determine, record, and communicate the location of crimps. Still further embodiments of the disclosure encompass tools other than those used to form crimps that are equipped with a location sensor to detect and record a location where the tool is used. These tools may include other hydraulic tools and non-hydraulic tools. Such tools might include welders, cutting tools, grinders, drills, and the like. According to one embodiment, geographic location information from these tools is also provided to the computing system and stored in the database. According to this embodiment, filtering criteria may be applied to show when and where these tools are used.

Referring to FIGS. 18-33, as set forth above, the present disclosure also contemplates embodiments of computing systems 250 that include one or more tools 10, one or more computing device 200, e.g., smartphones or other computing devices, and the web services 210. The computing system 250 also includes the App running on the smartphone that allows a user to take or upload an image (or picture) of one or more crimps and links the image (or picture) to a particular cycle data record associated with a crimp taken by a particular power tool 10. For ease of description, the images (or pictures) taken by the computing devices 200 may also be referred to collectively as the "image" in the singular and the "images" in the plural. The images may be stored in the memory of the computing device 200 and/or viewed on the homepage. These images stored in the memory of the computing device 200 can then be viewed on the display of the computing device 200 using the App. The images can also be shared amongst tool managers, tool users or other parties, e.g., contractors or inspectors, using the computing device's 200 communication features described herein, or the images can be uploaded from the computing device 200 to the web services 210 or other internet based computing systems using the communication features described herein. The images would then be stored in the database 214 of, for example, the web services 210. These images stored in the database 214 can then be viewed via the website. The images may also be uploaded to the tool 10 the images are associated with and stored in the memory 32 of that tool 10. The images stored in memory 32 can then be viewed on, for example, an LED display 31 included in the tool 10.

A process for imaging a crimp made by a tool 10 using a computing device 200 and uploading the image to a web service 210 will be described with reference to FIG. 18-33. The process for imaging a crimp made by a tool 10 using a computing device 200 and uploading the image to a web service 210 will be described with reference to FIG. 18-33. Initially, a tool user will be at a job site and making one or more crimps as described herein using the tool 10. When each crimp is made by the tool 10, the tool creates a cycle data record 222 for the crimp which is stored in memory 32 of the tool. As described above, the cycle information stored in the cycle data record 222 may include a time stamp, location information of the tool 10 when the crimp was made, and the crimp status when the crimp was made, seen in FIG. 12. As described above, the time stamp may include, for example, a time and date when the crimp was made. The location information may include, for example, latitude and longitude coordinates of the tool 10 when the crimp was made. The crimp Status may be logical value, such as a "Pass" or "Fail" or the crimp Status may be represented as the pressure or force applied by the tool to form the crimp.

If when making a crimp the tool user is unsure that the crimp meets predefined requirements the tool user may retrieve their computing device 200, here a smartphone, and launch the App to connect to or pair with the tool 10. Examples of causes of such unsureness may be; 1) misaligned die positioning on, for example, the lug connector 110 (seen in FIG. 6) or the splice connector 114 (seen in FIG. 7), 2) too much cable stripped, or 3) the tool user released the trigger 42 or 44 of the tool 10 too early. Once the tool 10 and smartphone 200 are paired, the App can sync with the tool 10 to retrieve the crimp history for the tool 10 and other tool information from the tool which is displayed on the display of the smartphone 200. The retrieved the crimp history for the tool 10 and other tool information may be stored in the memory of the computing device 200. Referring to FIGS. 14, 15, 19 and 20, the crimp history retrieved may include all cycle data records 222 for the tool 10 stored in the tool memory 32, or the retrieved crimp history may include a portion of the cycle data records stored in the tool memory 32, such as by a date range selected using the calendar icon. The other tool information may include, for example, information about the tool, such as the tool nickname, the tool model number and the tool serial number, and comments entered into the crimp comment field of the App for each cycle data record. The retrieved crimp history and other tool information may be upload to the web services database 214, seen in FIG. 10.

Figure 18:
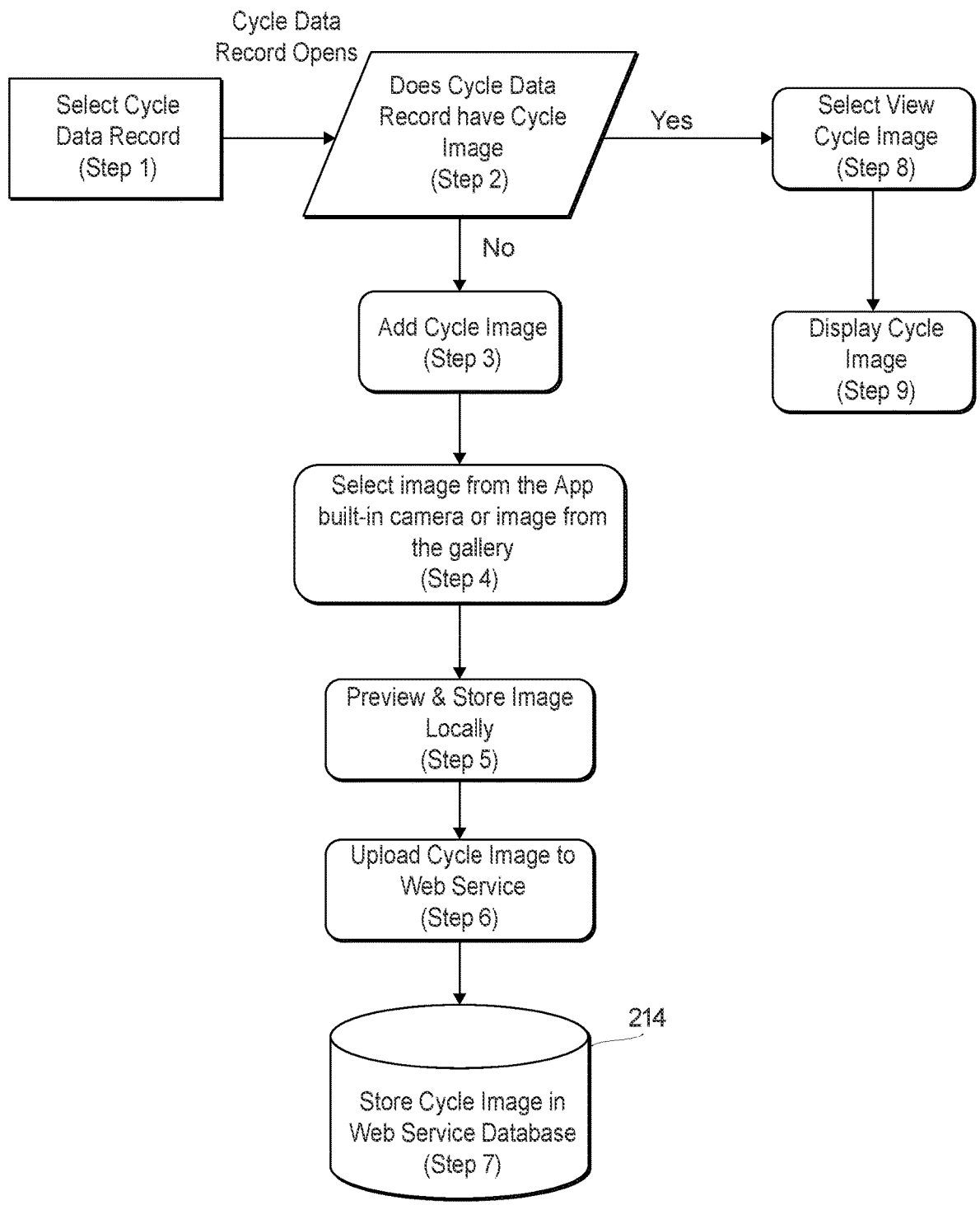
FIG. 18 is an exemplary flow diagram of a process for associating images of crimps to cycle data records.
Figure 20:
FIG. 20 is an exemplary rendering of a cycle data record without a linked image on an App running on a computing device forming part of a computing system used to manage the operation of one or more tools according to the present disclosure.
Figure 21:
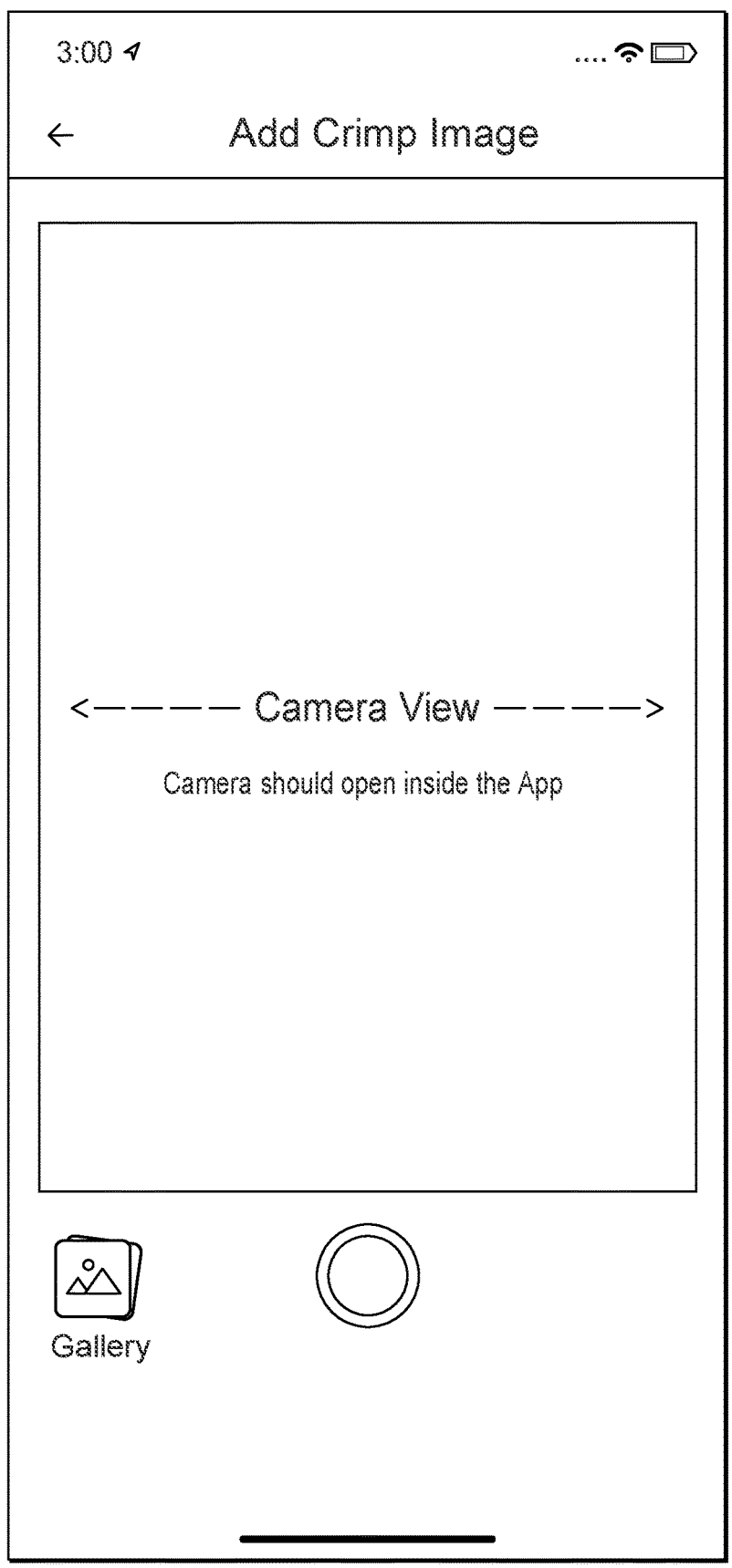
FIG. 21 is an exemplary rendering of a add crimp image function of an App running on a computing device forming part of a computing system used to manage the operation of one or more tools according to the present disclosure.
Figure 22:
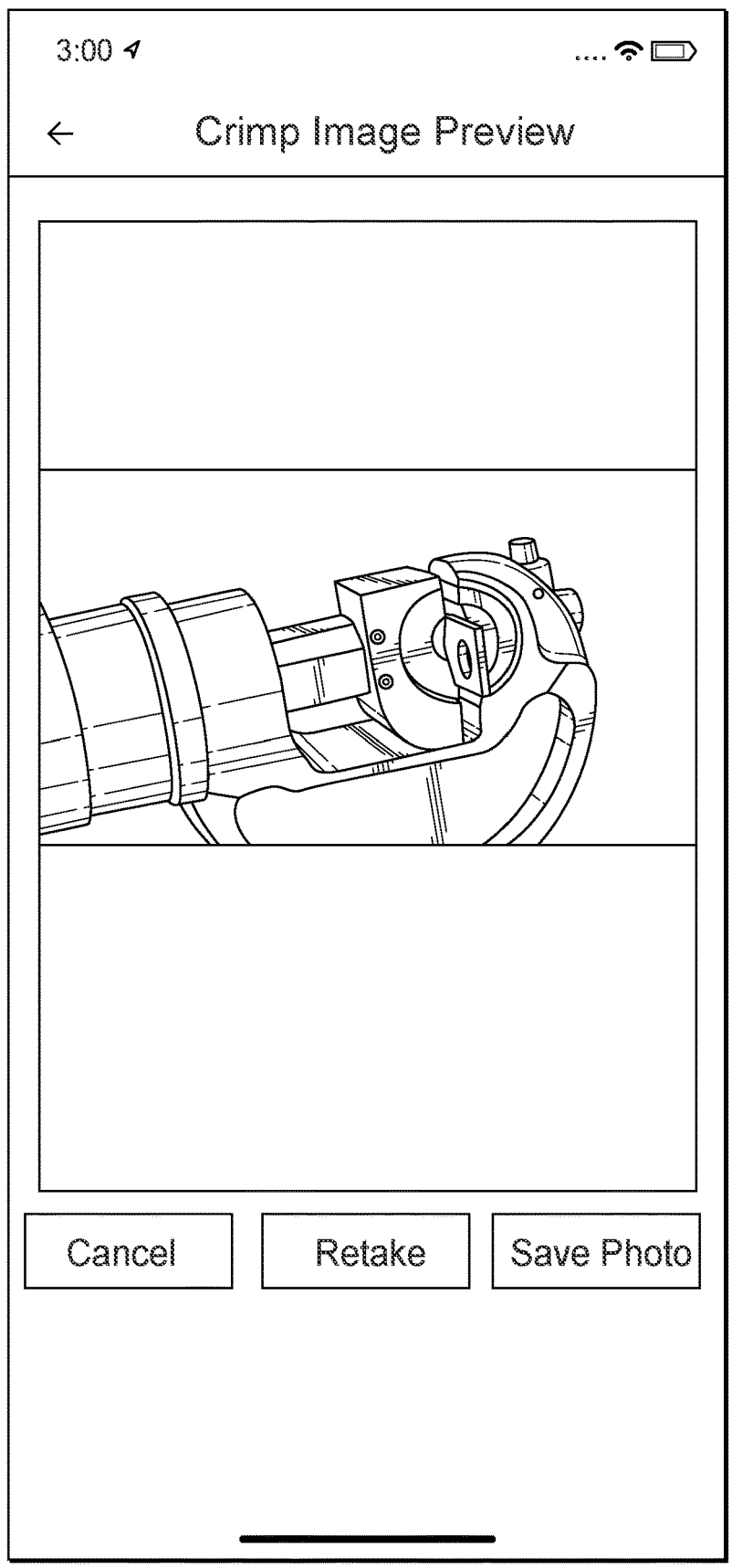
FIG. 22 is an exemplary rendering of a crimp image preview function of an App running on a computing device forming part of a computing system used to manage the operation of one or more tools according to the present disclosure.
Figure 24:
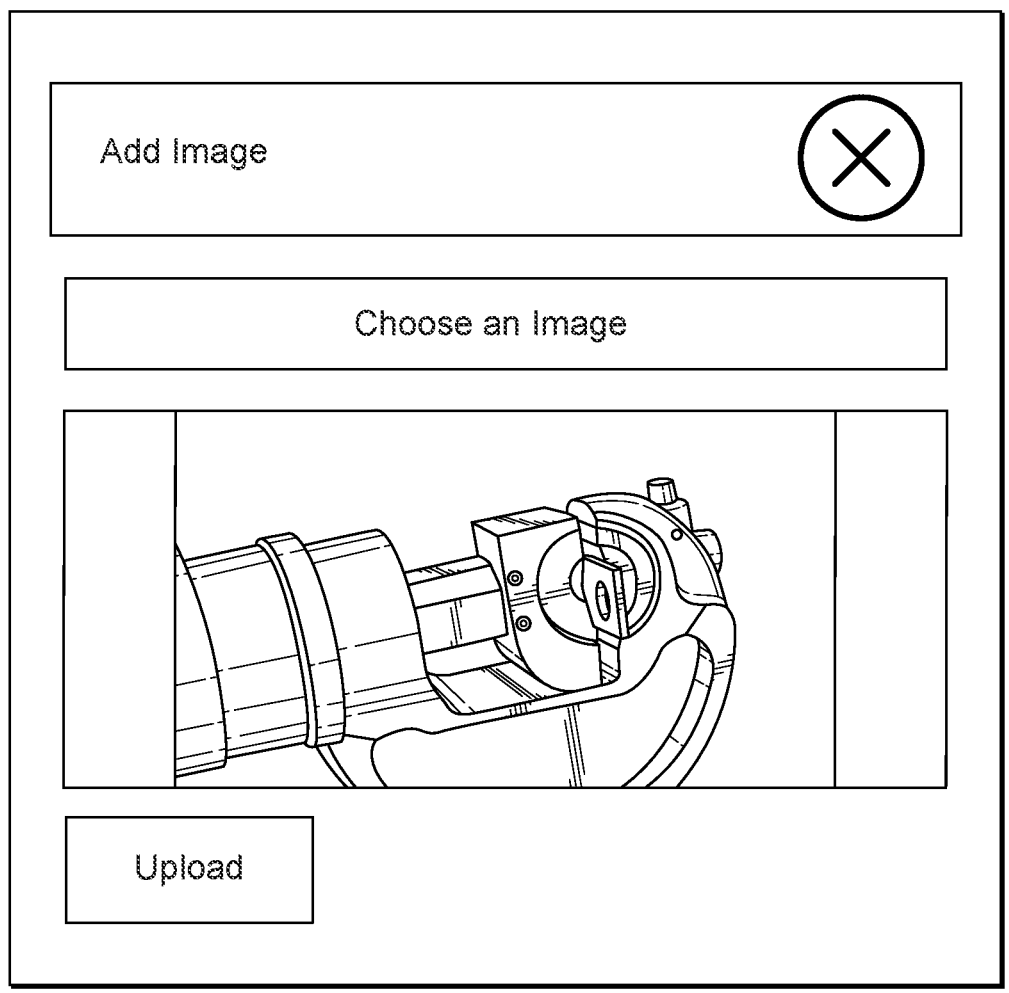
FIG. 24 is an exemplary rendering of a add crimp image function retrieved from a cloud computing service and rendered on a computing device forming part of a computing system used to manage the operation of one or more tools according to the present disclosure.

With the crimp history and other tool information stored in the memory of the smartphone 200 or the database 214 of the web services 210, the App or website, can be used to retrieve and present the crimp history for the tool 10 for viewing by the tool user. As shown in FIG. 18, the tool user viewing the crimp history can then search for the cycle data record of the crimp or crimps deemed to be questionable. As an example, and using the smartphone App, the tool user could base the search for the relevant crimp or crimps on the time stamp information, e.g., a certain date and time, or based on the order of the cycle data records defined by, for example, a crimp number. As shown in FIG. 19, a crimp history of ten cycle data records 222 are displayed on the smartphone via the App. Once the relevant crimp or crimps are located in the crimp history, the tool user can select the relevant cycle data record 222 being displayed by the App on the smartphone 200 by, for example, tapping the relevant cycle data record 222. As shown in FIG. 19, the relevant cycle data record 222 is the record for Crimp No. 3. When the relevant cycle data record 222 is tapped, the App loads a new page presenting detailed cycle information from the cycle data record as shown in FIG. 20 (FIG. 18, Step 1). It is noted that is this point, the tool user can enter comments into the Enter Comment field using the App as shown in FIG. 20. As seen in FIG. 19, each cycle data record 222 does not include a camera icon which means that the "Crimp Image" flag for those cycle data records 222 is set to "0" representing that no crimp image has been associated with those cycle data records. In addition, at Step 2, by looking at the cycle information for the cycle data record 222 for Crimp No. 3 displayed in FIG. 20, the tool user can determine by the presence of an "Add Crimp Image" button that an image of the crimp has not been associated with the cycle data record. Pressing the "Add Crimp Image" button (FIG. 18, Step 3), opens or launches the App's built-in camera function in a new page on the computing device 200, e.g., a smartphone, where a camera view is displayed, as seen in FIG. 21. At this point, the tool user has the option of taking a picture using the App's built-in camera function, or the tool user can select an image from the smartphone's 200 image gallery, i.e., the images stored in the memory of the smartphone (FIG. 18, Step 4). If the tool user takes a picture, the image is presented to the tool user in a "Crimp Image Preview" display, seen in FIG. 22, and if the image is acceptable the tool user can select the "Save Photo" button to store the image in the memory of the smartphone 200 (FIG. 18, Step 5). If the image is unacceptable, the tool user can select the "Retake" button to return to the App's built-in camera function of FIG. 21 so that a new picture of the crimp can be taken. The tool user can also press the cancel button. When saving the image using the "Save Photo" button after either taking a picture or selecting an image from the gallery, the image is also uploaded to the web service 210 (FIG. 18, Step 5) and stored in the database 214 of the web service 210 (FIG. 18, Step 5). When the image is uploaded to the web service 210 and stored in the database 214, the image is assigned a file name that includes the Serial Number of the tool 10 and the Cycle Data Record Index Number which is the Crimp Number seen in FIG. 20. As an example, when the image is uploaded to the web service 210 (FIG. 18, Step 6) and stored in the database 214 (FIG. 18, Step 7), the image can be assigned the following address:

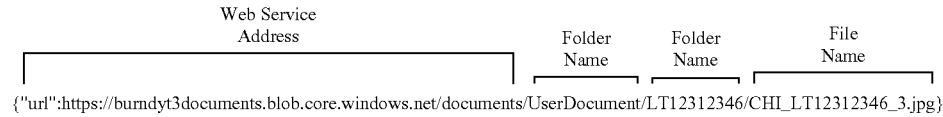

{"url":https://burndyt3documents.blob.core.windows.net/documents/UserDocument/LT12312346/CHI_LT12312346_3.jpg} where the "LT12312346" in the folder name and in the file name represent the Serial Number of the tool 10 and the "3" in the file name represents the Cycle Data Record Index Number which in this example is 3 to match the "Crimp Number" shown in FIGS. 19 and 20. By including the "Serial Number" of the tool 10 and the "Cycle Data Record Index Number" for the relevant cycle data record 222 an association is made between the stored image and the cycle data record. In addition, the "Crimp Image" flag in the cycle data record stored in the web service database 214 associated with the image is set to "1" reflecting that there is an image associated with the cycle data record. Once the image is uploaded to the web services database 214, the image can be retrieved and viewed through a browser from a computing device 200 connected to the web service 210, or through the App or another App of a computing device 200 connected to the web service 210. As noted above, the user may choose to associate an image with a cycle data record 222 from a computing device 200 via the web service 210. In such an instance, the user would retrieve the crimp history for the tool which is displayed on the display of the computing device 200 similar to that described above, and the user would select the relevant cycle data record 222 using, for example, the cursor of the computing device 200. The cycle information associated with the selected cycle data record 222 is then displayed on a new page on the display of the computing device 200, seen in FIG. 23. The operator may also close the displayed information. It is noted that the cycle data record 222 did not include a camera icon such that the "Crimp Image" flag for the cycle data record 222 was set to "0" representing that no crimp image has been associated with those cycle data records. The user can associate an image to the selected cycle data record by clicking on the "Add Crimp Image" button which opens an "Add Image" page, seen in FIG. 24. From the "Add Image" page the user can choose an image previously stored in the web service database 214 or other location by clicking on the "Choose Image" button. When the image is uploaded to the web service 210 and stored in the database 214, the image is assigned a file name that includes the Serial Number of the tool 10 and the Cycle Data Record Index Number which is the Crimp Number seen in FIG. 23 as described above.

Figure 26:
FIG. 26 is another exemplary rendering of a cycle data record with a linked image on an App running on a computing device forming part of a computing system used to manage the operation of one or more tools according to the present disclosure.
Figure 27:
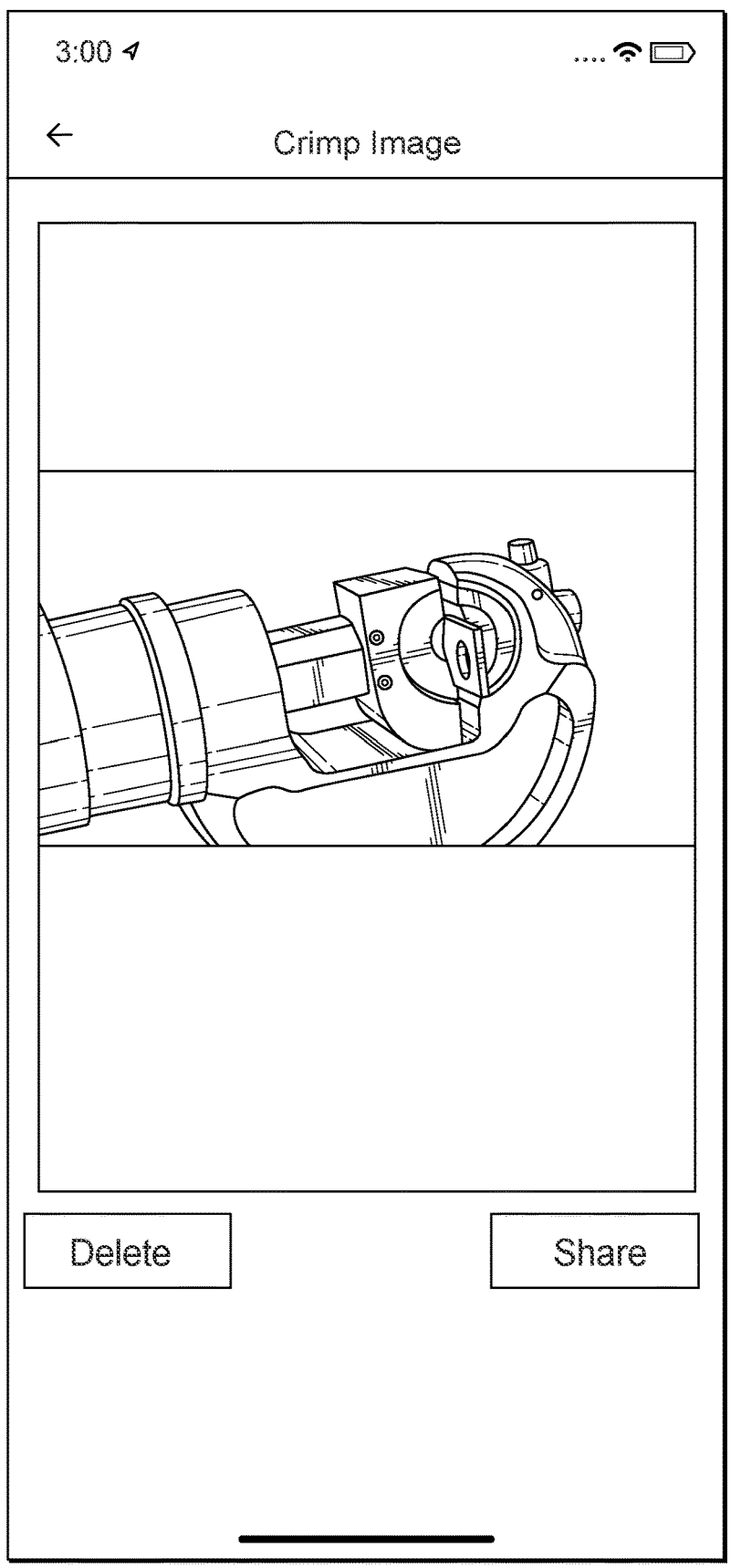
FIG. 27 is another exemplary rendering of a crimp image preview function of an App running on a computing device forming part of a computing system used to manage the operation of one or more tools according to the present disclosure.
Figure 29:
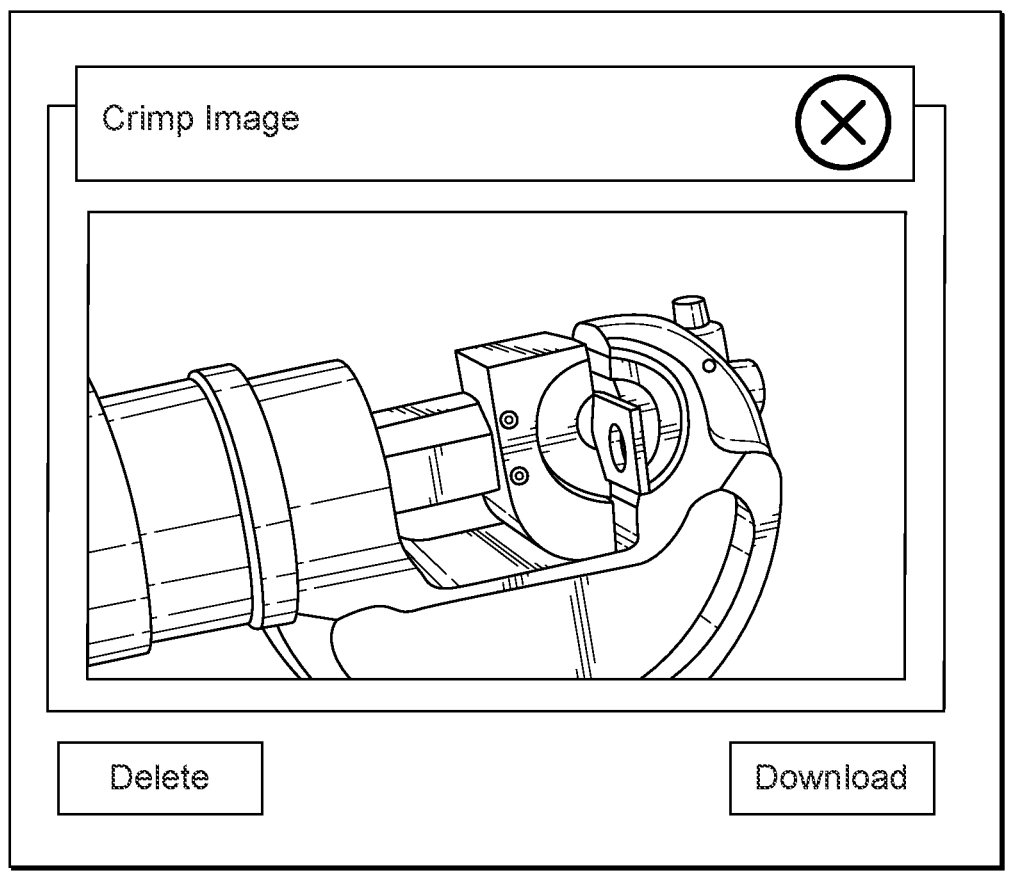
FIG. 29 is an exemplary rendering of a view crimp image function for retrieving a crimp image from a cloud computing service and rendering the crimp image on a computing device forming part of a computing system used to manage the operation of one or more tools according to the present disclosure.
Figure 32:
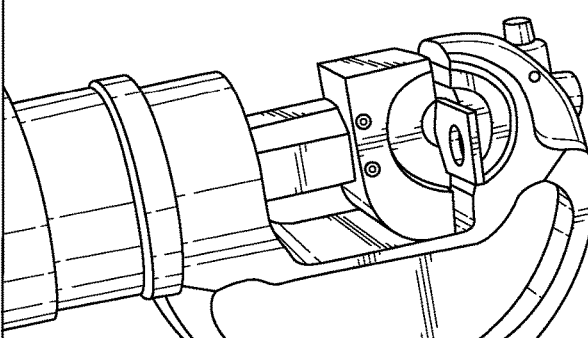
Figure 33:
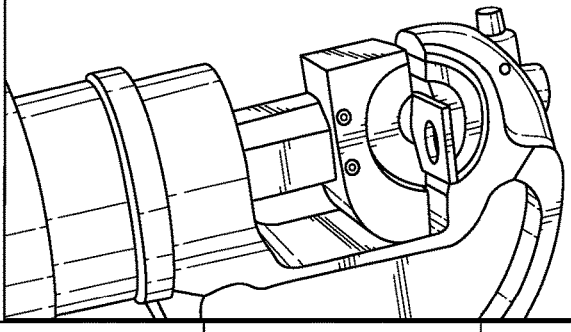

If at Step 2 the crimp history displayed by the App is shown in FIG. 25, there is a camera icon in each cycle data record 222. The camera icon appears in response to the "Crimp Image" flag in the cycle data records stored in the web service database 214 associated with the images is set to "1." When a cycle data record 222 is selected by tapping on the cycle data record, the cycle information for the selected cycle data record, here the cycle information for Crimp No. 3, is displayed on the computing device 200, e.g., smartphone, by the App, as seen in FIG. 26. Pressing the "View Crimp Image" button (FIG. 18, Step 8) the crimp image is retrieved from the web service database 214 and displayed by the App on the display of the computing device 200, e.g., smartphone, as seen in FIG. 27. To retrieve the crimp image associated with Crimp No. 3, the App makes a request to the Web Service 210 to retrieve the image associated with Crimp No. 3 for the tool 10 with Serial No. LT12312346, by going to the following web service 210 address:

user from the crimp history displayed on the display of the computing device 200, the cycle information for the selected cycle data record, here the cycle information for Crimp No. 3, is displayed on the computing device 200, as seen in FIG. 28. Pressing the "View Image" button causes the crimp image to be retrieved from the web service database 214 and displayed on the display of the computing device 200, as seen in FIG. 29. To retrieve the crimp image associated with Crimp No. 3, the web services makes a request to the to retrieve the image associated with Crimp No. 3 for the tool 10 with Serial No. LT12312346, from the database 214 by going to the web service 210 address set forth above.

Using the tool 10, computing device 200 and web service 210 described herein, a tool user can upload an image for a crimp (as explained above) and then contact their supervisor/inspector to review the image they just uploaded to the web service database 214 for that crimp. The tool user may also add a comment to the relevant cycle data record 222, such as "Check out the image for Crimp No. 3 on 'Bob's Tool.' How does the crimp look to you?" The supervisor can then retrieve the image in their App or their web browser and can make a comment saying that the crimp was reviewed and either passed or needed to be redone.

Referring to FIGS. 30-33, while logged into the computing system 250 on a web browser, the user has the ability to generate reports, e.g., PDF reports, for specific tools 10. Such reports may include the Crimp No., the timestamp (e.g., date/time) when crimps were made by the tool 10, the location (e.g., GPS location) of the tool 10 when the crimp was made, and verification of the crimp based on force or pressure data from the tool. If the crimps have any comments or images associated with them, they will be visible in the report as well. Exemplary images and comments from the questionable crimps described herein can be saved and associated to the relevant crimps so that any reports generated show that such information and provide full traceability of crimps.

Besides images of connectors, images of other objects could be used as well. For example, if using the tool 10 in a datacenter when GPS may be unreliable, tool users may instead form the habit of using the crimp comments to indicate location descriptions to help track crimps, e.g. "First crimp in cabinet B-32". With the crimp image feature described herein, instead of typing out these descriptions, tool users can now take a picture of the location as well as of the crimp. A picture of the location itself could be helpful for locating the crimp at a later date, or a close up picture of identification information associated with the location of the crimp, e.g., a nameplate or label of cabinet B-32. Other images that could be taken include images of the tool 10 to document wear and tear of the tool over its lifetime. Images of people could be taken to indicate when a tool 10 was passed off to someone else. An image could be taken of a signed safety review checklist and uploaded with the first crimp of each day to indicate the operator was briefed on the

```
                    Web Service
                    Address              Folder   Folder    File
                                         Name     Name      Name
{"url":https://burndyt3documents.blob.core.windows.net/documents/UserDocument/LT12312346/CHI_LT12312346_3.jpg}
```

As noted above, the user may choose to retrieve and present the crimp history for the tool 10 for viewing on a computing device 200 via the web service 210. In such an example, when a cycle data record 222 is selected by the safety measures for that work area. The user has flexibility to decide how and what they would like to take images of and associate them to crimps for their own tracking and responsible traceability.

In other exemplary embodiments, the tool 10 could include a camera to take pictures so that the tool 10 can store images in the tool's 10 memory 32 without using the App or browser. If some time has passed before the tool user uploads an image, there could be the option to suggest certain crimps based on the image's timestamp. Multiple images could be associated per crimp instead of just one, and visual processing could be done on the crimp images to automatically inspect the crimps to determine their viability.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A tool system comprising:
   a tool having a tool frame and a working head coupled to the tool frame, the working head configured to perform an operation on a workpiece;
   an actuator disposed at least partially in the tool frame and operatively coupled to the working head to perform the operation on the workpiece;
   a drive system positioned within the tool frame and used to perform an operating cycle to move the actuator between a home position and an operating position where the working head performs the operation on the workpiece; and
   a control system including:
      a tool memory to store tool information and tool cycle information, the tool cycle information being associated with the operation performed on the workpiece by the working head during the operating cycle; and
      a controller electrically connected with the tool memory and the actuator, wherein in response to an activation signal, the controller causes the drive system to perform the operating cycle to move the actuator between the home position and the operating position and after the operating cycle, stores the tool cycle information associated with the operation performed on the workpiece by the working head during the operating cycle in the tool memory; and
      a mobile platform having a camera, the mobile platform being wirelessly paired to the control system of the tool, wherein an image of a result of the operation performed on the workpiece during the operating cycle taken by the mobile platform is linked to the tool cycle information stored in the tool memory associated with the operation performed on the workpiece by the working head during the operating cycle.

2. The tool system according to claim 1, wherein the mobile platform comprises a smartphone.

3. The tool system according to claim 1, further comprising a cloud computing service in wireless communication with the mobile platform.

4. The tool system according to claim 3, wherein the cloud computing service comprises a web service.

5. The tool system according to claim 3, wherein the mobile platform receives the stored tool cycle information from the control system and transmits the stored tool cycle information and the linked images to the cloud computing service.

6. The tool system according to claim 3, wherein the mobile platform receives the stored tool information from the control system and transmits the stored tool information to the cloud computing service.

7. The tool system according to claim 1, wherein the control system further comprises a sensor adapted to measure a force applied by the working head on the workpiece, and wherein the tool cycle information includes the measured force.

8. The tool system according to claim 1, wherein the control system further comprises a location detector configured to determine a geographic location of the tool when the controller causes the actuator to move from the home position to the operating position, and wherein the tool cycle information includes the geographic location of the tool.

9. The tool system according to claim 1, wherein the tool is a crimping tool and the working head is configured to perform a crimping operation on the workpiece.

10. The tool system according to claim 8, wherein the geographic location of the tool provides information indicating a general location of the tool and wherein the image of the result of the operation performed on the workpiece during the operating cycle taken by the mobile platform comprises information indicating a specific location of the operation.

11. The tool system according to claim 1, wherein the image of the result of the operation performed on the workpiece during the operating cycle comprises information associated with a location of the operation.

12. The tool system according to claim 1, wherein the image of the result of the operation performed on the workpiece during the operating cycle comprises an image of the tool documenting wear and tear of the tool.

13. The tool system according to claim 1, wherein the image of the result of the operation performed on the workpiece during the operating cycle comprises an image of a user of the tool.

14. The tool system according to claim 1, wherein the image of the result of the operation performed on the workpiece during the operating cycle further comprises an image of a document indicating a user was briefed on safety measures.

15. The tool system according to claim 1, wherein the mobile platform comprises a camera function allowing a user to take an image of the operation performed on the workpiece during the operating cycle, preview the image, retake the image if desired and link the image to the tool cycle information.

16. The tool system according to claim 15, wherein the mobile platform further comprises a second camera function allowing a user to select an image related to the operation performed on the workpiece during the operating cycle from a mobile platform memory and link the selected image to the tool cycle information.

17. A tool system comprising:
   a tool having a tool frame and a working head coupled to the tool frame, the working head configured to perform an operation on a workpiece;
   an actuator disposed at least partially in the tool frame and operatively coupled to the working head to perform the operation on the workpiece;
   a drive system positioned within the tool frame and used to perform an operating cycle to move the actuator between a home position and an operating position where the working head performs the operation on the workpiece; and a control system including:
a tool memory to store tool information and tool cycle information, the tool cycle information being associated with the operation performed on the workpiece by the working head during the operating cycle;
a sensor adapted to measure a force applied by the working head on the workpiece during the operating cycle, and wherein the tool cycle information includes the measured force;
a location detector configured to determine a geographic location of the tool when the controller causes the drive system to perform the operating cycle to move the actuator between the home position and the operating position, and wherein the tool cycle information includes the geographic location of the tool;
a controller electrically connected with the tool memory, the sensor, the location detector and the actuator, wherein in response to an activation signal the controller causes the drive system to perform the operating cycle to move the actuator between the home position and the operating position and after the operating cycle, stores the tool cycle information associated with the operation performed on the workpiece by the working head during the operating cycle in the tool memory; and
a mobile platform having a camera, the mobile platform being wirelessly paired to the control system of the tool, wherein an image of a result of the operation performed on the workpiece during the operating cycle taken by the mobile platform is linked to the tool cycle information stored in the tool memory associated with the operation performed on the workpiece by the working head during the operating cycle.

18. The tool system according to claim 17, wherein the mobile platform comprises a smartphone.

19. The tool system according to claim 17, further comprising a cloud computing service in wireless communication with the mobile platform.

20. The tool system according to claim 19, wherein the cloud computing service comprises a web service.

21. The tool system according to claim 19, wherein the mobile platform receives the stored tool cycle information from the control system and transmits the stored tool cycle information and the linked images to the cloud computing service.

22. The tool system according to claim 19, wherein the mobile platform receives the stored tool information from the control system and transmits the stored tool information to the cloud computing service.

23. The tool system according to claim 17, wherein the tool is a crimping tool and the working head is configured to perform a crimping operation on the workpiece.

24. The tool system according to claim 17, wherein the geographic location of the tool provides information indicating a general location of the tool and wherein the image of the result of the operation performed on the workpiece during the operating cycle taken by the mobile platform comprises information indicating a specific location of the operation.

25. The tool system according to claim 17, wherein the image of the result of the operation performed on the workpiece during the operating cycle comprises information associated with a location of the operation.

26. The tool system according to claim 17, wherein the image of the result of the operation performed on the workpiece during the operating cycle comprises an image of the tool documenting wear and tear of the tool.

27. The tool system according to claim 17, wherein the image of the result of the operation performed on the workpiece during the operating cycle comprises an image of a user of the tool.

28. The tool system according to claim 17, wherein the image of the result of the operation performed on the workpiece during the operating cycle further comprises an image of a document indicating a user was briefed on safety measures.

29. The tool system according to claim 17, wherein the mobile platform comprises a camera function allowing a user to take an image of the operation performed on the workpiece during the operating cycle, preview the image, retake the image if desired and link the image to the tool cycle information.

30. The tool system according to claim 29, wherein the mobile platform further comprises a second camera function allowing a user to select an image related to the operation performed on the workpiece during the operating cycle from a mobile platform memory and link the selected image to the tool cycle information.

31. A tool system comprising:
a crimping tool having a tool frame and a working head coupled to the tool frame, the working head having an impactor and anvil, the impactor being movable and having a first working surface, and the anvil being fixed and having a second working surface;
an actuator disposed at least partially in the tool frame and having one end coupled to the impactor, the actuator being movable between a home position and a crimping position;
a drive system positioned within the tool frame and used to perform an operating cycle to move the actuator between the home position and the crimping position where the first working surface and the second working surface crimps a workpiece positioned between the first working surface and the second working surface during a crimping operation; and
a control system including:
a tool memory to store tool information and tool cycle information, the tool cycle information being associated with the crimping operation performed on the workpiece by the first working surface and the second working surface of the working head during the operating cycle; and
a controller electrically connected with the tool memory and the actuator, wherein in response to an activation signal, the controller causes the drive system to perform the operating cycle to move the actuator between the home position and the crimping position and after the operating cycle stores the tool cycle information associated with the crimping operation performed on the workpiece by the working head during the operating cycle in the tool memory; and
a mobile platform having a camera, the mobile platform being wirelessly paired to the control system of the tool, wherein an image of a result of the crimping operation performed on the workpiece during the operating cycle taken by the mobile platform is linked to the tool cycle information stored in the tool memory associated with the crimping operation performed on the workpiece by the working head during the operating cycle.

32. The tool system according to claim 31, wherein the mobile platform comprises a smartphone.

33. The tool system according to claim 31, further comprising a cloud computing service in wireless communication with the mobile platform.

34. The tool system according to claim 33, wherein the cloud computing service comprises a web service.

35. The tool system according to claim 31, wherein the control system further comprises a sensor adapted to measure a force applied by the first working surface and the second working surface of the working head on the workpiece, and wherein the tool cycle information includes the measured force.

36. The tool system according to claim 31, wherein the control system further comprises a location detector configured to determine a geographic location of the tool when the controller causes the actuator to move from the home position to the crimping position, and wherein the tool cycle information includes the geographic location of the crimping tool.

37. The tool system according to claim 36, wherein the geographic location of the tool provides information indicating a general location of the tool and wherein the image of the result of the crimping operation performed on the workpiece during the operating cycle taken by the camera comprises information indicating a specific location of the crimping operation.

38. The tool system according to claim 31, wherein the image of the result of the crimping operation performed on the workpiece during the operating cycle comprises information associated with a location of the crimping operation.

39. The tool system according to claim 31, wherein the image of the result of the crimping operation performed on the workpiece during the operating cycle comprises an image of the tool documenting wear and tear of the tool.

40. The tool system according to claim 31, wherein the image of the result of the crimping operation performed on the workpiece during the operating cycle comprises an image of a user of the tool.

41. The tool system according to claim 31, wherein the image of the result of the crimping operation performed on the workpiece during the operating cycle further comprises an image of a document indicating a user was briefed on safety measures.

42. The tool system according to claim 31, wherein the mobile platform comprises a camera function allowing a user to take an image of the crimping operation performed on the workpiece during the operating cycle, preview the image, retake the image if desired and link the image to the tool cycle information.

43. The tool system according to claim 42, wherein the mobile platform further comprises a second camera function allowing a user to select an image related to the crimping operation performed on the workpiece during the operating cycle from a mobile platform memory and link the selected image to the tool cycle information.

\* \* \* \* \*